(12) United States Patent
LePoudre et al.

(10) Patent No.: US 12,486,989 B2
(45) Date of Patent: Dec. 2, 2025

(54) INTEGRATED PANEL DESIGN

(71) Applicant: Nortek Air Solutions Canada, Inc., Saskatoon (CA)

(72) Inventors: Philip Paul LePoudre, Saskatoon (CA); Gaoming Ge, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 232 days.

(21) Appl. No.: 18/268,031

(22) PCT Filed: Dec. 16, 2021

(86) PCT No.: PCT/CA2021/051816
§ 371 (c)(1),
(2) Date: Jun. 16, 2023

(87) PCT Pub. No.: WO2022/126269
PCT Pub. Date: Jun. 23, 2022

(65) Prior Publication Data
US 2024/0053032 A1  Feb. 15, 2024

Related U.S. Application Data

(60) Provisional application No. 63/127,779, filed on Dec. 18, 2020.

(51) Int. Cl.
*F24F 5/00* (2006.01)
*F24F 3/14* (2006.01)
*H05K 7/20* (2006.01)

(52) U.S. Cl.
CPC .......... *F24F 5/0035* (2013.01); *F24F 3/1417* (2013.01); *H05K 7/208* (2013.01)

(58) Field of Classification Search
CPC ...... F24F 5/0035; F24F 3/1417; F24F 5/0014; F24F 2203/026; F24F 15/025; F24F 15/02
See application file for complete search history.

(56) References Cited

U.S. PATENT DOCUMENTS 3,735,559 A * 5/1973 Salemme ............. C08G 65/485
                                                           95/52
5,727,394 A * 3/1998 Belding ................ F24F 1/0043
                                                           62/304
(Continued)

FOREIGN PATENT DOCUMENTS

IN    202317048065 A    1/2023
WO    WO-2018191806 A1  10/2018
WO    WO-2022126269 A1  6/2022

OTHER PUBLICATIONS

"International Application Serial No. PCT/CA2021/051816, International Search Report mailed Mar. 21, 2022", 4 pgs.
(Continued)

*Primary Examiner* — David J Teitelbaum
(74) *Attorney, Agent, or Firm* — Schwegman Lundberg & Woessner, P.A.

(57) ABSTRACT

A conditioning system includes a liquid-to-air energy exchanger (LAEE) having a plurality of energy exchange (EX) circuits. The LAEE includes a single liquid panel, an air channel, and a plurality of membranes. The single liquid panel has a 5 plurality of liquid circuits through each of which a liquid is configured to flow. Each of the plurality of liquid circuits has a plurality of closed liquid channels through each of which a liquid is configured to flow without mixing with the liquid flowing through other of the plurality of closed liquid channels. Each of the liquid circuits corresponds to each of the plurality of EX circuits. The air channel is adjacent the 10 liquid panel and air is configured to flow through the air channel from an inlet of the LAEE to an outlet of the LAEE. The air channel extends adjacent all of the plurality of liquid circuits. The plurality of membranes is connected to the liquid panel. At least one of the plurality of membranes corresponds to each of the plurality of liquid circuits. Each one of the plurality of membranes is disposed (Continued)

between the respective 15 liquid circuit and the air channel. Each of the plurality of EX circuits is configured to exchange at least one of latent and sensible energy between a liquid flowing through the respective liquid circuit and the air.

20 Claims, 19 Drawing Sheets

(56) References Cited

U.S. PATENT DOCUMENTS

| | | | |
|---|---|---|---|
| 9,273,877 B2 | 3/2016 | Vandermeulen | |
| 9,816,760 B2 | 11/2017 | Lepoudre et al. | |
| 10,352,628 B2 | 7/2019 | Erb et al. | |
| 10,502,438 B2 | 12/2019 | Owejan et al. | |
| 2003/0033821 A1* | 2/2003 | Maisotsenko | F24F 3/1411 62/310 |
| 2004/0211207 A1* | 10/2004 | Forkosh | F24F 3/1417 62/304 |
| 2018/0128510 A1* | 5/2018 | LePoudre | F24F 3/1411 |
| 2019/0353358 A1 | 11/2019 | Allen et al. | |
| 2020/0063995 A1 | 2/2020 | Lepoudre | |

OTHER PUBLICATIONS

"International Application Serial No. PCT/CA2021/051816, Written Opinion mailed Mar. 21, 2022", 5 pgs.

"European Application Serial No. 21904729.7, Extended European Search Report mailed Nov. 22, 2024", 9 pgs.

"European Application Serial No. 21904729.7, Response filed Jun. 10, 2015 to Extended European Search Report mailed Nov. 22, 2024", 36 pgs.

"International Application Serial No. PCT/CA2021/051816, International Preliminary Report on Patentability mailed Jun. 29, 2023", 7 pgs.

"Singaporean Application Serial No. 11202304681P, Voluntary Amendment Filed Jun. 16, 2023", 25 pgs.

* cited by examiner

INTEGRATED PANEL DESIGN

PRIORITY PARAGRAPH

This application is a National Stage of PCT Application Serial No. PCT/CA2021/051816, filed Dec. 16, 2021, and published as WO 2022/126269 A1 on Jun. 23, 2022, which claims priority to U.S. Provisional Application Ser. No. 63/127,779, filed Dec. 18, 2020, which are hereby incorporated by reference herein in their entirety.

BACKGROUND

There are many applications for which controlling the environmental conditions within an enclosed space is important—for example, cooling data centers. A data center usually consists of computers and associated components operating 24 hours a day, 7 days a week. The electrical components in data centers produce a lot of heat, which needs to be removed from the space. Air-conditioning systems in data centers can consume as much as 40% of the total energy.

Comfort cooling of residential, commercial and institutional buildings is predominantly done using vapor-compression cooling equipment. Many process applications, such as data centers, also use mechanical cooling for primary or supplemental cooling. In most of these applications, the required cooling temperature is moderate (for example, 50° F.-85° F.; 10° C.-30° C.). Mechanical cooling equipment can produce high cooling capacities, operate reliably and can have acceptable cost due to mass production of compressors, exchangers and other components. However, these systems require significant amounts of high grade electrical energy to operate. For example, about 15% of the total annual US domestic electricity production is consumed by air conditioning units. Moreover, about one-third of the peak demand in hot summer months is driven by air conditioning units, leading to issues with power grid loading and stability. The production of electricity remains carbon intensive, so electricity driven cooling systems can contribute significantly to emissions and global warming.

Thermoelectric power production requires vast amounts of water for cooling, and the US average water consumption (evaporated water) for combined thermoelectric and hydroelectric power production is about 2 gallons/kWh. The water consumed to produce the electricity required by an EER 11 air conditioner is about equivalent to the water consumed by a good efficiency evaporative cooling system producing an equivalent amount of cooling. However, evaporative cooling systems consume far less electricity. Vapor-compression also typically requires synthetic refrigerants operating at high pressures. The deployment of large quantities of refrigerants in air conditioning and refrigeration systems has resulted in safety, health and environmental concerns. Modern high efficiency refrigerants, such as HFCs, can have high global warming potential and are being phased out. There is currently no direct replacement refrigerant option that has all the desired properties in terms of efficiency, stability, flammability, toxicity, and environmental impact.

Evaporative cooling systems are used successfully in many applications, especially in dry climates. Direct evaporative coolers (DEC) can be simple in design and efficient, compared to, for example, vapor compression systems. However, conventional DECs can have some drawbacks. The supply air temperature coming out of the cooler may be challenging to control and is dependent on the outdoor air temperature and humidity level. The supply air may be excessively humid. These systems need careful maintenance to ensure that bacteria, algae, fungi and other contaminants do not proliferate in the water system and transfer into the supply air stream. Since these systems utilize direct contact between the evaporating liquid water and supply air, carry-over of contaminants into the air stream can occur, which can, in turn, lead to reduced indoor air quality, odors and "sick building syndrome." Also, buildup of mineral deposits in the unit and on the evaporative pads can reduce performance and require maintenance.

Indirect evaporative coolers address the humidity problem but typically operate at lower wet bulb efficiencies. State-of-the-art dew-point evaporative coolers can deliver lower cooling temperatures than conventional direct or indirect evaporative systems and can maintain cooling power to higher outdoor wet bulb temperatures. However, all evaporative cooling technologies lose cooling performance as the working air humidity rises and cannot be used in humid climates without supplemental (usually vapor compression) cooling equipment. The water usage efficiency of evaporative cooling systems also varies widely depending on the system design and control characteristics. The water usage of evaporative coolers can be a problem, or at least a perceived problem. For example, large scale data centers may consume large quantities of potable water. Moreover, for those locations in which evaporative cooling works best (dry climates), the water demand may not be sustainable.

Absorption chillers are increasingly being adopted for comfort and process cooling, especially when waste heat is available. These systems have been successfully commercialized for larger scale applications and can be a good alternative to mechanical cooling in integrated building designs where the required technical and maintenance support is available. Single-effect absorptions chillers have a COP less than one, so significant quantities of heat are required to drive the system. Current absorption chiller designs are intended to replace electric chillers and deliver comparable cooling temperatures (40° F.-50° F.; 4.4° C.-10° C.). This requires the use of specialized materials (alloy metals), vacuum vessels, multiple heat exchangers, relatively high grade heat input for the generator, control methods to prevent crystallization, etc. Higher efficiency double and triple effect designs are increasingly complex and expensive. The complexity, cost and maintenance requirements of absorption systems may limit their widespread acceptance as an alternative to mechanical cooling, especially in light commercial and residential applications.

There remains a need for alternative cooling technologies for comfort conditioning applications, which can largely replace mechanical cooling. The growing awareness of environmental impacts, electricity consumption and increasing regulatory pressure on refrigerants are pressing challenges for current HVAC cooling equipment. There is a need for a commercially viable design which meets requirements for capital and installation costs, operating costs, performance, reliability, size/weight restrictions, etc., while avoiding the creation of any new resource utilization problems, such as excessive water or gas consumption. The design should have good cooling performance and compactness, make use of low cost materials, and avoid the use of any environmentally harmful or toxic substances. From a thermodynamic perspective, the system should operate near atmospheric pressures with low grade heat input, employ moderate temperature changes and exchange fluxes to minimize irreversibility in the system and improve second law efficiency. Comfort conditioning may only require low grade cooling, and an exergy analysis shows how wasteful it is to use precious high grade energy sources such as electricity to drive cooling equipment.

BRIEF DESCRIPTION OF THE DRAWINGS

In the drawings, which are not necessarily drawn to scale, like numerals may describe similar components in different views. Like numerals having different letter suffixes may represent different instances of similar components, subcomponents of a larger logical or physical system, or the like. The drawings illustrate generally, by way of example, but not by way of limitation, various examples described in the present disclosure.

OVERVIEW

Figure 1A:
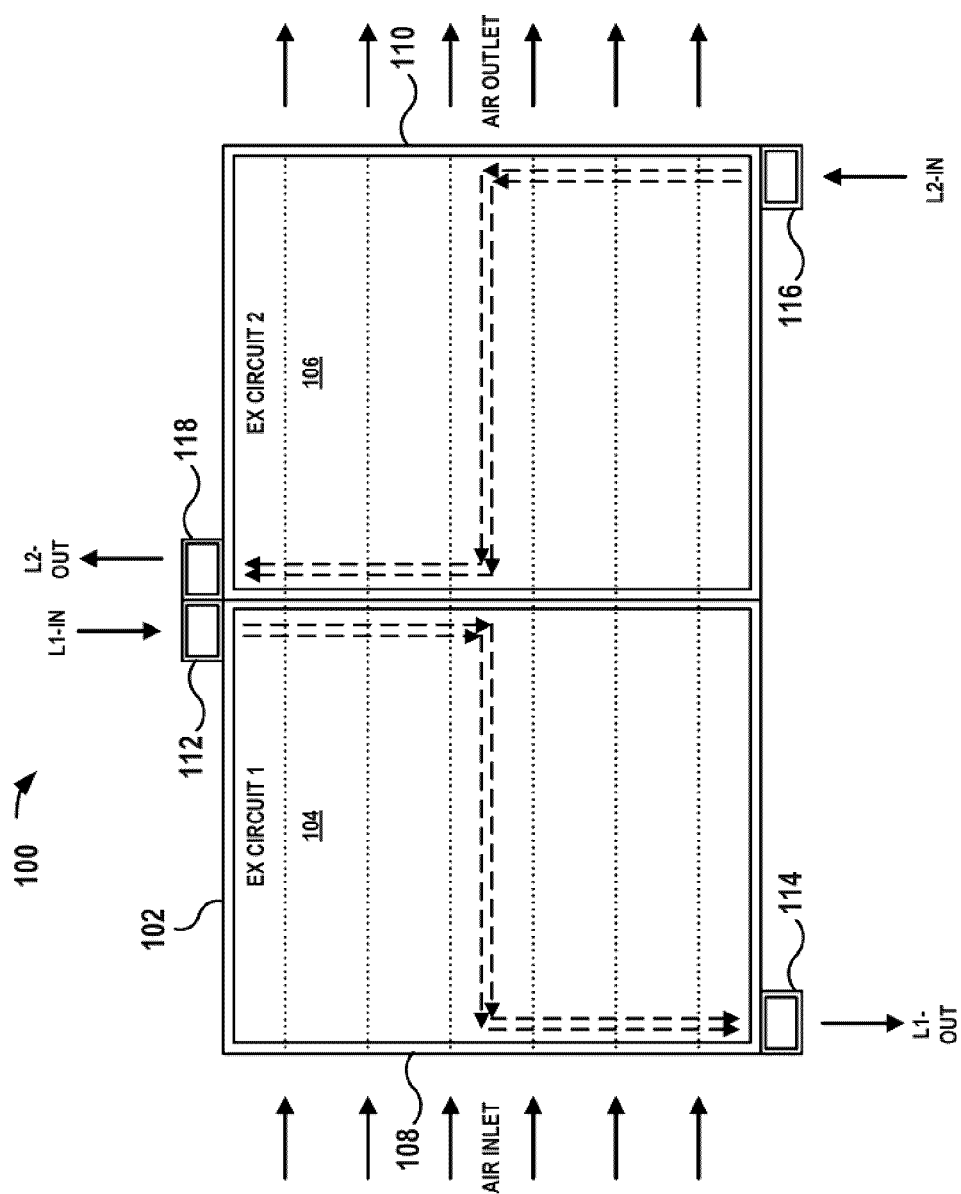
FIGS. 1A and 1B schematically depict an example liquid-to-air energy exchanger (LAEE) in accordance with this disclosure.

In an example, a conditioning system includes a liquid-to-air energy exchanger (LAEE) having a plurality of energy exchange (EX) circuits. The LAEE includes a single liquid panel, an air channel, and a plurality of membranes. The single liquid panel has a plurality of liquid circuits through each of which a liquid is configured to flow. Each of the plurality of liquid circuits has a plurality of closed liquid channels through each of which a liquid is configured to flow without mixing with the liquid flowing through other of the plurality of closed liquid channels. Each of the liquid circuits corresponds to each of the plurality of EX circuits. The air channel is adjacent the liquid panel and air is configured to flow through the air channel from an inlet of the LAEE to an outlet of the LAEE. The air channel extends adjacent all of the plurality of liquid circuits. The plurality of membranes is connected to the liquid panel. At least one of the plurality of membranes corresponds to each of the plurality of liquid circuits. Each one of the plurality of membranes is disposed between the respective liquid circuit and the air channel. Each of the plurality of EX circuits is configured to exchange at least one of latent and sensible energy between a liquid flowing through the respective liquid circuit and the air.

In another example, a method includes arranging a liquid-to-air energy exchanger (LAEE) having a plurality of energy exchange (EX) circuits within or in proximity to an enclosed space. The LAEE includes a single liquid panel, an air channel, and a plurality of membranes. The single liquid panel has a plurality of liquid circuits through each of which a liquid is configured to flow. Each of the liquid circuits corresponds to each of the plurality of EX circuits. The air channel is adjacent the liquid panel and air is configured to flow through the air channel from an inlet of the LAEE to an outlet of the LAEE. The air channel extends adjacent all of the plurality of liquid circuits. The plurality of membranes are connected to the liquid panel. Each of the plurality of membranes corresponds to each of the plurality of liquid circuits and is disposed between the respective liquid circuit and the air channel. The method also includes directing air through the air channel from the inlet of the LAEE to the outlet of the LAEE, directing one or more liquids through each of the plurality of liquid circuits of the single liquid panel, and, in each of the plurality of EX circuits, exchanging at least one of latent and sensible energy between a liquid flowing through the respective liquid circuit and the air flowing through the air channel through the respective membrane.

This overview is intended to provide an overview of subject matter of the present patent application. It is not intended to provide an exclusive or exhaustive explanation of the invention. The detailed description is included to provide further information about the present patent application.

DETAILED DESCRIPTION

The present application relates to systems and methods for conditioning air in an enclosed space. The inventor(s) have conceived a new design for a multi-stage integrated panel liquid-to-air energy exchanger (LAEE). Example LAEEs in accordance with this disclosure are configured to exchange energy, either or both latent and sensible energy between one or more liquids and air flowing through the LAEE. Example LAEEs include a plurality of liquid and air channels stacked side-by-side with an air channel between pairs of liquid channels. Each of the liquid channels includes a single liquid panel that includes multiple liquid circuits. Each air channel extends across all of the multiple liquid circuits of the single liquid panel. Each of the liquid circuits of the single liquid panel can include an impermeable or semi-permeable membrane to form a barrier between the air channel and a respective liquid circuit of the liquid panel. The multiple liquid circuits can receive and transmit the same or different types of liquids and the single liquid panel configures the LAEE with a plurality of energy exchanger (EX) circuits (or stages) corresponding to the plurality of liquid circuits of the panel. Each EX circuit, although combined in an integrated conditioning unit formed by one or more single liquid panels, functions as a separate energy exchange/conditioning unit, and the combination of multiple EX circuits in series and, in some cases, in parallel may improve the conditioning (e.g., cooling, heating, humidification/dehumidification) capacity of the LAEE. Additionally, the design including a single liquid panel extending the length of the LAEE from air inlet to air outlet may significantly improve the cost, complexity, maintenance, and size requirements of example LAEEs relative to systems including multiple, separate and distinct conditioning units.

Figure 1B:
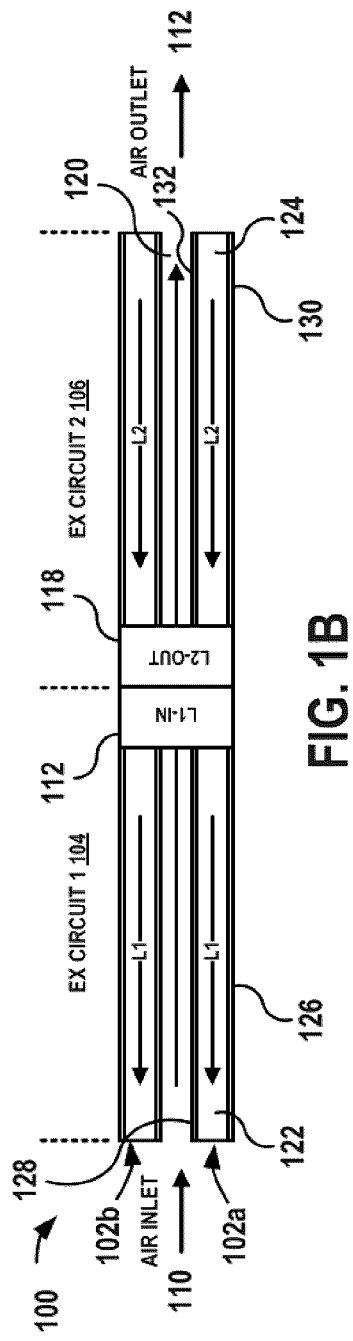

FIGS. 1A and 1B schematically depict example liquid-to-air energy exchanger (LAEE) 100 in accordance with this disclosure. Referring to FIG. 1A, LAEE 100 includes liquid panel(s) 102, first energy exchange (EX) circuit 104, second EX circuit 106, air inlet 108, air outlet 110, first liquid (L1) inlet 112, L1 outlet 114, second liquid (L2) inlet 116, and L2 outlet 118. LAEE 100 can include a plurality of liquid and air channels stacked side-by-side with an air channel between pairs of liquid channels. Referring to FIG. 1B, which is a plan view schematically depicts air channel 120 between two single liquid panels 102a and 102b. Each liquid panel 102a and 102b has first liquid circuit 122 and second liquid circuit 124 through each of which a liquid is configured to flow. As described in more detail below with reference to FIGS. 1C-1, each of first liquid circuit 122 and second liquid circuit 124 has a plurality of closed liquid channels through each of which a liquid is configured to flow without mixing with the liquid flowing through other of the plurality of closed liquid channels. Each of first liquid circuit 122 and second liquid circuit 124 corresponds to each of first EX circuit 104 and second EX circuit 106.

Air channel 120 is adjacent the two single liquid panels 102a and 102b. Air channel 120 extends adjacent all of the plurality of liquid circuits of liquid panels 102a and 102b, including first liquid circuit 122 and second liquid circuit 124. Air flows through air channel 120 from air inlet 110 to air outlet 112 of LAEE 100.

A number of membranes are connected to each of single liquid panels 102a and 102b. Referring to FIG. 1B, liquid panel 102a includes a pair of first membranes 126 and 128, which are connected to either side of and encloses first liquid circuit 122. Liquid panel 102a also includes a pair of second membranes 130 and 132, which are connected to either side of and encloses second liquid circuit 124.

First membranes 126 and 128 are disposed between first liquid circuit 122 and a pair of air channels (only one of the pair, air channel 120 shown in FIG. 1B) and form a barrier between a first liquid (L1) flowing through first liquid circuit 122 and air flowing through the air channels, e.g. air channel 120. Similarly, second membranes 130 and 132 are disposed between second liquid circuit 124 and a pair of air channels (only one of the pair, air channel 120 shown in FIG. 1B) and form a barrier between a second liquid (L2) flowing through second liquid circuit 124 and air flowing through the air channels, e.g. air channel 120.

Each of first EX circuit 104 and second EX circuit 106 corresponds to each of first liquid circuit 122 and second liquid circuit 124 and each EX circuit is configured to exchange at least one of latent and sensible energy between a liquid flowing through the respective liquid circuit and the air flowing through air channel 120. For example, and as will be described in more detail below, first liquid circuit 122 may circulate a liquid desiccant from L1 inlet 112 to L1 outlet 114 and first EX circuit 104 can include a semi-permeable membrane 126, 128 to configure the first EX circuit as a desiccant dryer liquid-to-air semi-permeable membrane energy exchanger. Second liquid circuit 124, as an example, can circulate water from L2 inlet 116 to L2 outlet 118 and second EX circuit 106 can include a semi-permeable membrane 130, 132 to configure the second EX circuit as an evaporative cooler. In this manner, LAEE 100 (and other example LAEEs in accordance this disclosure) is formed of a plurality of single liquid panels each of which includes a plurality of liquid circuits, which, along with interposed air channels forms a single energy exchange component with multiple EX circuits. In the example of FIGS. 1A and 1B, the plurality of EX circuits of are arranged in series in a direction of air flow through LAEE 100. In other examples described below, example multi-stage/multi-circuit integrated panel LAEEs in accordance with this disclosure include multiple EX circuits in series and, in some examples, in parallel.

Figure 1C:
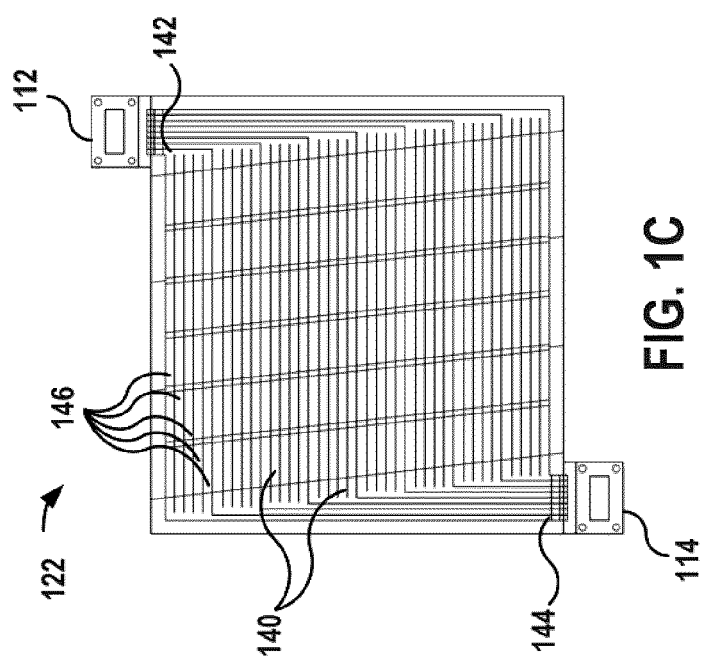
FIG. 1C depicts aspects of a first liquid circuit of the single liquid panel employed in the example LAEE of FIGS. 1A and 1B.

FIG. 1C depicts aspects of first liquid circuit 122 of single liquid panel 102a including multiple liquid circuits. First liquid circuit 122 has a plurality of closed liquid channels 140 through each of which a liquid is configured to flow without mixing with the liquid flowing through other of the plurality of closed liquid channels 140. Each of liquid channels 140 includes liquid inlet 142 connected to liquid outlet 144 through a plurality of flow passages 146. The first liquid, L1 enters first liquid circuit 122 through L1 inlet 112, which is fluidically connected to channel liquid inlet 142. L1 exits first liquid circuit 122 through L1 outlet 114, which is fluidically connected to channel liquid outlet 144. Liquid channel inlets 142 of liquid channels 140 of first liquid circuit 122 are disposed at a diagonally opposed corner of first liquid circuit 122 as liquid channel outlets 144. Additionally, liquid channel inlets 142 and liquid channel outlets 144 are approximately vertically arranged and flow passages 146 are approximately horizontally arranged. In this manner, first liquid circuit 122 can be configured for cross-counter-flow of the liquid flowing therethrough relative to the air flowing through air channel 120, as schematically depicted in FIG. 1A. As shown in FIG. 1C, flow passages 146 of one of closed liquid channels 140 can be staggered with respect to flow passages 146 of other of closed liquid channels 140.

First liquid circuit 122 of single liquid panel 102a can include frame 148 defining a perimeter of the liquid circuit. In examples, membranes 126, 128 may be connected to frame 148 of first liquid circuit 122. Membranes 126, 128 (and other membranes in examples according to this disclosure) can be adhered, heat sealed, laser bonded, ultrasonically bonded, or otherwise connected to frame 148 of first liquid circuit 122. Additionally, membranes 125, 128 (and other membranes in examples according to this disclosure) can include semi-permeable and impermeable membranes. In an example, membranes 125, 128 can be semi-permeable and materials in a gas/vapor phase can pass through the membrane and materials in a liquid or solid phase cannot pass through the membrane. Semi-permeable membranes can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquids, solids, and vapor/gas of other constituents of the liquid.

Figure 2A:
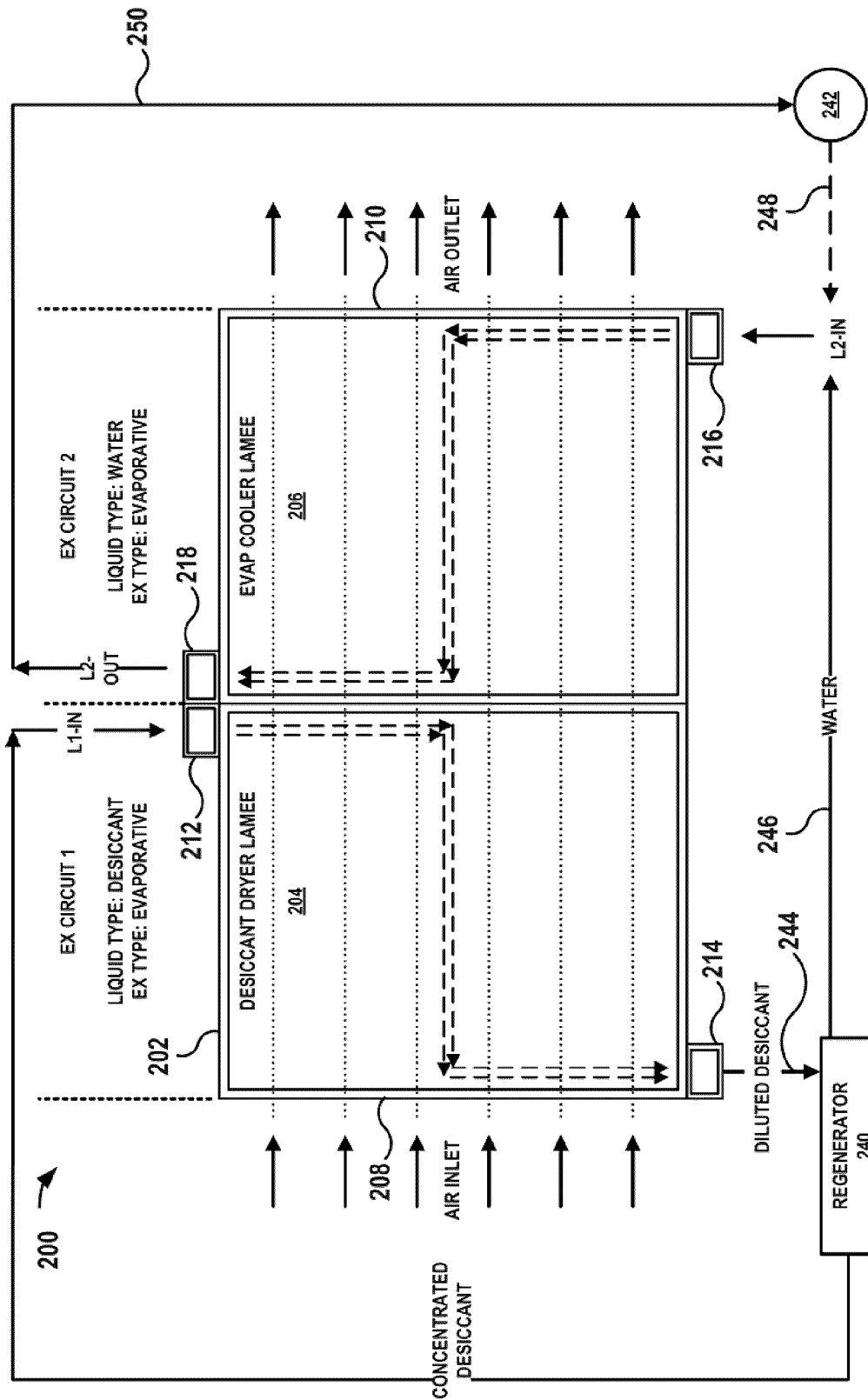
FIGS. 2A and 2B schematically depict another example LAEE in accordance with this disclosure.
Figure 2B:
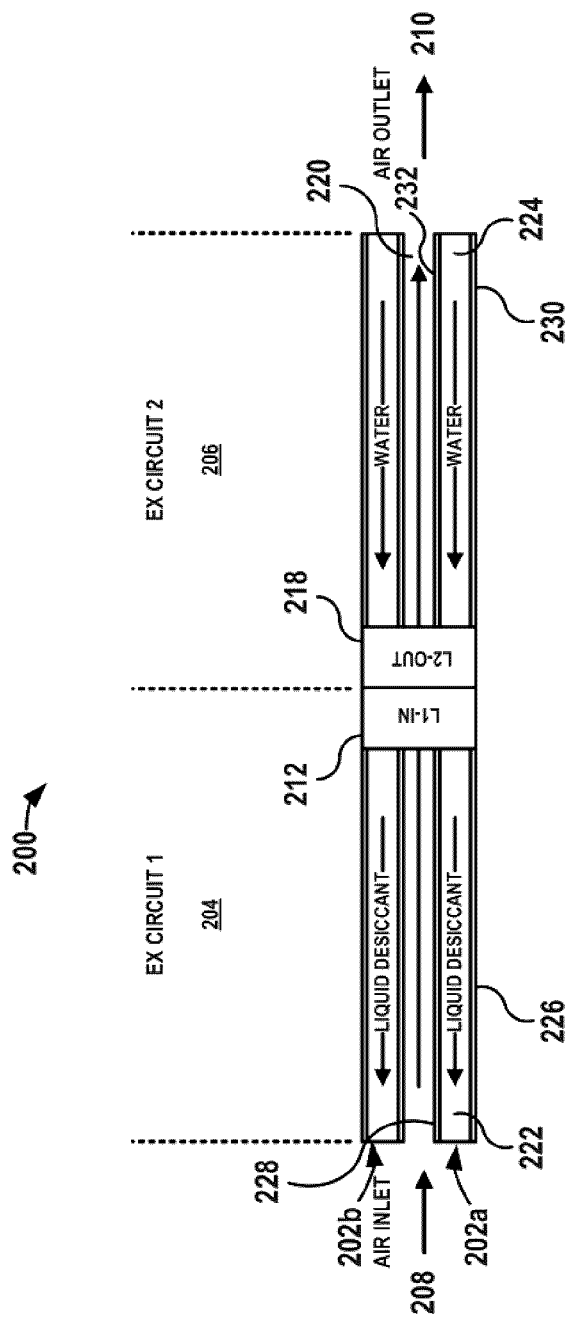

FIGS. 2A and 2B schematically depict example liquid-to-air energy exchanger (LAEE) 200 in accordance with this disclosure. Referring to FIG. 2A, LAEE 200 includes liquid panel(s) 202, desiccant dryer energy exchange (EX) circuit 204, evaporative cooler EX circuit 206, air inlet 208, air outlet 210, first liquid (L1) inlet 212, L1 outlet 214, second liquid (L2) inlet 216, and L2 outlet 218. LAEE 200 can include a plurality of liquid and air channels stacked side-by-side with an air channel between pairs of liquid channels. Referring to FIG. 2B, which is a plan view schematically depicting air channel 220 between two single liquid panels 202a and 202b. Each liquid panel 202a and 202b has first liquid circuit 222 and second liquid circuit 224 through each of which a liquid is configured to flow. As with the example of FIGS. 1A-1C, each of first liquid circuit 222 and second liquid circuit 224 has a plurality of closed liquid channels through each of which a liquid is configured to flow without mixing with the liquid flowing through other of the plurality of closed liquid channels. Each of first liquid circuit 222 and second liquid circuit 224 corresponds to each of desiccant dryer EX circuit 204 and evaporative cooler EX circuit 206.

Air channel 220 is adjacent the two single liquid panels 202a and 202b. Air channel 220 extends adjacent all of the plurality of liquid circuits of liquid panels 202a and 202b, including first liquid circuit 222 and second liquid circuit 224. Air flows through air channel 220 from air inlet 208 to air outlet 210 of LAEE 200.

A number of membranes are connected to each of single liquid panels 202a and 202b. Referring to FIG. 2B, liquid panel 202a includes a pair of first membranes 226 and 228, which are connected to either side of and encloses first liquid circuit 222. Liquid panel 202a also includes a pair of second membranes 230 and 232, which are connected to either side of and encloses second liquid circuit 224.

First membranes 226 and 228 are disposed between first liquid circuit 222 and a pair of air channels (only one of the pair, air channel 220 shown in FIG. 2B) and form a barrier between a first liquid (L1) flowing through first liquid circuit 222 and air flowing through the air channels, e.g. air channel 220. Similarly, second membranes 230 and 232 are disposed between second liquid circuit 224 and a pair of air channels (only one of the pair, air channel 220 shown in FIG. 2B) and form a barrier between a second liquid (L2) flowing through second liquid circuit 224 and air flowing through the air channels, e.g. air channel 220.

Each of desiccant dryer EX circuit 204 and evaporative cooler EX circuit 206 corresponds to each of first liquid circuit 222 and second liquid circuit 224 and each EX circuit is configured to exchange at least one of latent and sensible energy between a liquid flowing through the respective liquid circuit and the air flowing through air channel 220. In the example of FIGS. 2A and 2B, first liquid circuit 222 circulates a liquid desiccant from L1 inlet 212 to L1 outlet 214 and first EX circuit 204 includes semi-permeable membranes 226, 228 to configure the first EX circuit as a desiccant dryer liquid-to-air semi-permeable membrane energy exchanger (LAMEE). In this example, the liquid desiccant flowing through first liquid circuit 222 absorbs water from the air flowing through first EX circuit 204 such that a moisture content of the air exiting the first EX circuit is lower than a moisture content of the air entering the first EX circuit. Second liquid circuit 224, as an example, circulates water from L2 inlet 216 to L2 outlet 218 and second EX circuit 206 includes semi-permeable membranes 230, 232 to configure the second EX circuit as an evaporative cooler LAMEE. In this example, membranes 230 and 232 can be semi-permeable membranes and evaporative cooler EX circuit 206 can evaporatively cool at least one of the water and the air flowing through EX circuit 206 such that a temperature of the at least one of the water and the air exiting evaporative cooler EX circuit 206 is lower than a temperature of the at least one of the water and the air entering evaporative cooler EX circuit 206.

This example of FIGS. 2A and 2B describes separate first membrane 226 and second membrane 230 for one side of liquid panel 202a and separate first membrane 228 and second membrane 232 on the opposite side of liquid panel 202a. However, because in this example the membranes (226, 228) of first liquid circuit 222 are the same type, i.e. semi-permeable, as the membranes (230, 232) of adjacent second liquid circuit 224, in another example according to this disclosure a single membrane could be attached to one side of liquid panel 202a covering both first liquid circuit 222 and second liquid circuit 224 and another single membrane could be attached to the opposite side of panel 202a to cover and enclose both first liquid circuit 222 and second liquid circuit 224.

Example of LAEE 200 in which first EX circuit 204 is a desiccant dryer and second EX circuit 206 is an evaporative cooler could enhance the cooling capacity of prior LAEE designs with a liquid panel including only one liquid circuit corresponding to the one EX circuit of such prior LAEEs. In particular, the multi-stage integrated panel design of LAEE 200 could enhance cooling capacity in hot and humid climates and could thereby reduce the need for or eliminate additional trim cooling. For example, the inventors estimate that cooling capacity could be increased by 208 kW by applying this two-stage liquid desiccant-water integrated panel design. Use of such example LAEEs may also reduce the peak electrical power consumption for the electrically intensive vapor compression cycle in trim cooling chillers and the associated water consumption in cooling towers, among other advantages and benefits of examples in accordance with this disclosure.

Referring again to FIG. 2A, LAEE 200 is fluidically connected to desiccant regenerator 240 and evaporative cooler water destination 242. Additionally, LAEE 100 includes first liquid transport circuit 244 and second liquid transport circuit 246. Regenerator 240 can include a variety of different types of liquid desiccant regeneration devices and/or systems. In general, regenerator 240 is configured to increase a concentration of the liquid desiccant exiting desiccant dryer EX circuit 204 by removing water from the liquid desiccant Regenerator 240 can include any type of device capable of separating liquid water from the liquid desiccant. For example, the regenerator 240 can include, but is not limited to, vacuum multi-effect membrane distillation (VMEMD), electro-dialysis, reverse osmosis filtration, a gas boiler with condenser, a vacuum assisted generator, multi-stage flash, membrane distillation, and combinations thereof. The type of energy input to regenerator 240 can include, for example, electrical power, mechanical power, and/or heat, as examples. In examples, regenerator 240 (and other regenerators employed in other examples according to this disclosure) is a thermally or heat driven versus higher grade energy inputs like electricity.

First liquid transport circuit 244 is connected to L1 outlet 214 of the desiccant dryer EX circuit 204 and transports diluted liquid desiccant exiting desiccant dryer EX circuit 204 to regenerator 240. Additionally, regenerator 240 is fluidically connected to L1 inlet 212 of desiccant dryer EX circuit 204 to transport concentrated liquid desiccant back to desiccant dryer EX circuit 204. Second liquid transport circuit 246 is connected to a liquid outlet of regenerator 240 and transports at least a portion of the water removed from the liquid desiccant by regenerator 240 to L2 inlet 216 of evaporative cooler EX circuit 206.

Although not depicted in FIG. 2A, the liquid transport circuits that transport desiccant and water between various components of the system can include additional components, including, for example, pumps, valves, and liquid reservoirs to facilitate transport, storage, mixing, etcetera of the liquid desiccant and water. For example, a liquid reservoir can be interposed between L1 outlet 214 and regenerator 240. In such an example, an example system including LAEE 200 can be designed such that only a portion of the desiccant exiting desiccant dryer EX circuit 204 is regenerated. Thus, in such an example, LAEE 200 can continue operating efficiently without requiring all of the diluted desiccant exiting desiccant dryer EX circuit 204 to flow through regenerator 240.

Additionally, example systems including LAEE 200 can include different types of heat exchangers that are arranged and configured to cool (or otherwise condition) liquid desiccant exiting desiccant dryer EX circuit 204. For example, a liquid-to-air heat exchanger (LAHX) or liquid-to-liquid heat exchanger (LLHX) can be configured to cool liquid desiccant prior to recirculating the concentrated liquid desiccant back into desiccant dryer EX circuit 204 via L1 inlet 212.

Depending upon the application in which LAEE is used, among other factors, desiccant dryer EX circuit 204 can be configured such that the liquid desiccant removes at least one of water and heat from the air stream. It is recognized that if the desiccant only removes water from the air (i.e. the air remains at a generally constant temperature between the inlet and the outlet of desiccant dryer EX circuit 204), a temperature of the desiccant at L1 outlet 214 of desiccant dryer EX circuit 204 can be higher than a temperature of the desiccant at L1 inlet 212. The temperature increase of the desiccant is due to the latent heat of condensation of the moisture from the air. Evaporative cooler EX circuit 206 can be configured to modulate the temperature and/or the humidity (moisture content) of the air using the water flowing through evaporative cooler EX circuit 206. Additionally, evaporative cooler EX circuit 206 can be configured to modulate the temperature of the water flowing through evaporative cooler EX circuit 206 using the air.

The design of desiccant dryer EX circuit 204 allows for the desiccant to not only remove water from the air stream, but the desiccant can also remove heat from the air stream. Desiccant dryer EX circuit 204 can be configured such that essentially all of the energy removed from the air stream is transferred to the desiccant stream. In other words, an energy and/or enthalpy reduction of the air in the air stream between the inlet and outlet of desiccant dryer EX circuit 204 can be about equal to an energy gain of the liquid desiccant in the desiccant stream between L1 inlet 212 and L1 outlet 214. It is recognized that there may be some loss inherent in the system and 100% of the energy removed from the air stream may not be transferred to the desiccant stream. For purposes herein, the term "essentially all of the energy" or "all of the energy" recognizes and accounts for such losses in the system. Similarly, for purposes herein, "about equal" in reference to the energy reduction of the air relative to the energy gain of the desiccant recognizes and accounts for the system not being 100% efficient and having some loss.

Desiccant dryer EX circuit 204 can be configured such that a single liquid (the desiccant) can be used to remove heat and water (or water vapor/moisture) from the air. Thus, desiccant dryer EX circuit 204 can be a two-fluid design— the first fluid being the air stream and the second fluid the desiccant. In examples, additional fluids are not included for reducing the energy of the air, and the single desiccant stream flowing through desiccant dryer EX circuit 204 can sufficiently remove heat and water from the air stream passing there through. The heat from the air stream can primarily be latent heat, although some sensible heat can also be removed from the air by the desiccant. Because the flow rate of liquid desiccant through desiccant dryer EX circuit 204 is relatively high, a temperature increase of the desiccant between L1 inlet 212 and L1 outlet 214 of desiccant dryer EX circuit 204 is small, compared to if the flow rate was low.

LAEE 200 can be used in variety of different environmental conditioning applications, including commercial and industrial, as well as residential applications. In one example, LAEE 200 can be used for cooling air in an enclosed space, which may be heated by equipment and conditions in the space. In an example of LAEE 200 implemented as a direct evaporative cooler for cooling air within an enclosed space, e.g. a data center, LAEE 200 can define or can be housed in a cabinet that defines a process air plenum. In such an application, LAEE 200 can receive process air, in some cases hot return air from the enclosed space and condition the process air such that it can be returned to the enclosed space as reduced-temperature and/ or reduced-humidity supply air. In some examples, LAEE 200 or the process plenum in which it is arranged can receive outdoor air and condition the outdoor air prior to delivering the outdoor air to the enclosed space. In other examples, LAEE 200 can receive a mix or combination of outdoor air and return air from the enclosed space.

In an example in which the conditioning system including LAEE 200 receives process air from the enclosed space, the system may be referred to as a 100% recirculation system, which generally means that the air within the enclosed space recirculates through the LAEE 200 in a continuous cycle of being cooled by LAEE 200 to a target supply air temperature, supplied to the space, heated by elements in the space (for example, computers, servers, and other electronics), and returned to air inlet 208 of LAEE 200. Although not shown or described in detail, in such an example, example systems including LAEE 200 can include a make-up air unit or system, to continuously or periodically refresh the air within the space to satisfy ventilation requirements. Additionally, although not shown in FIG. 2A, example systems including LAEE 200 can include one or more fans 110 arranged inside the process air plenum, e.g., upstream of the desiccant dryer EX circuit 204 or in some other location to push or draw air through LAEE 200.

In air cooling applications of LAEE 200, evaporative cooler water destination 242 can be L2 inlet 216 or a water reservoir that is connected to L2 inlet 216. In such cases, the water exiting evaporative cooler EX circuit 206 at L2 outlet 218 can be recirculated back to evaporative cooler EX circuit 206 after the water has been used to cool (and otherwise condition) the air flowing through EX circuit 206 and supplied to the enclosed space via air outlet 210. The water exiting evaporative cooler EX circuit 206 at L2 outlet 218 can be mixed with water from a water supply, e.g., a cooled water supply that when mixed with water exiting EX circuit 206 effectively cools the water exiting EX circuit 206 to an acceptable inlet water temperature. Additionally, the water exiting evaporative cooler EX circuit 206 at L2 outlet 218 can be mixed with water recovered from the diluted desiccant regenerated in regenerator 240 and transported to L2 inlet 216 or a reservoir connected thereto via second liquid transport circuit 246.

In examples implementing LAEE 200 for cooling return air from the enclosed space (and/or outdoor air) and supplying cooled air to the space, evaporative cooler EX circuit 206 can be configured to adiabatically cool the air flowing through EX circuit 206. A cooling potential of evaporative cooler EX circuit 206 may be limited by a humidity level of the air stream entering LAEE 200. Desiccant dryer EX circuit 204, located upstream of evaporative cooler EX circuit 206, can reduce the humidity of the air stream such that dryer air, relative to the air's moisture content at air inlet 208, enters evaporative cooler EX circuit 206. Dehumidification of the air upstream of evaporative cooler EX circuit 206 can allow for reaching lower air temperatures in evaporative cooler EX circuit 206 and thus can provide the ability to efficiently supply the air to the enclosed space at a wider range of set point temperatures.

A primary function of desiccant dryer EX circuit 204 can be to lower the moisture content, as well as the enthalpy, of the air passing through EX circuit 204. As such, a moisture level of the air exiting desiccant dryer EX circuit 204 can be significantly lower than a moisture level of the air entering EX circuit 204. Similarly, an enthalpy of the air exiting desiccant dryer EX circuit 204 can be significantly lower than an enthalpy of the air entering EX circuit 204. In an example, a temperature of the air exiting desiccant dryer EX circuit 204 can be about equal to or lower than a temperature of the air entering EX circuit 204. In another example, a temperature of the air exiting desiccant dryer EX circuit 204 can be higher than a temperature of the air entering EX circuit 204.

The air can flow through evaporative cooler EX circuit 206, which as an evaporative cooler can adiabatically cool the air using evaporation. Thus, the process air exiting evaporative cooler EX circuit 206 can be at a lower temperature than the air entering EX circuit 206. After exiting evaporative cooler EX circuit 206, the air can be directed through air outlet 210 or an outlet of a process air plenum in which LAEE 200 is arranged and can be delivered to the enclosed space as supply air.

In an example, operation of LAEE 200 can be controlled such that a moisture content of the air exiting evaporative cooler EX circuit 206 can be about equal to a moisture content of the air entering LAEE 200 at air inlet 208. In another example, the moisture content of the air exiting evaporative cooler EX circuit 206 can be lower or higher than the moisture content of the air at the inlet 208.

The design of LAEE 200 can facilitate cooling the air to a discharge set point temperature over a large range of humidity levels. LAEE 200 can replace vapor-compression cooling equipment in comfort cooling applications (residential or commercial) or in process air cooling applications, like a data center. LAEE 200 can facilitate DX-free (direct expansion free) cooling in a wide range of climates.

LAEE 200 including multiple EX circuits, including desiccant dryer EX circuit 204 and evaporative cooler EX circuit 206 can achieve cooling comparable to an absorption chiller. However, in contrast to an absorption chiller, LAEE 200 can operate at or near atmospheric pressure and does not require sealed chambers under vacuum. This can eliminate the need for special materials and complexity resulting from operating LAEE 200, or components thereof, under vacuum. As compared to a DX system, which may require high operating pressures (for example, 400 psi), LAEE 200 can advantageously operate at or near atmospheric pressure.

LAEE 200 can directly cool the air stream and thus can be configured with a single working air stream. This can result in a compact system with a lower footprint and reduced costs.

The design of LAEE 200 including desiccant dryer EX circuit 204 can facilitate collection of a significant amount of water from the air. Such water is contained within the dilute desiccant exiting desiccant dryer EX circuit 204 at L1 outlet 214. As described above, the water can be separated from the desiccant and transported to other parts of LAEE 200. In an example, the water can be transported to evaporative cooler EX circuit 206. The design of the conditioning system 100 can markedly reduce or eliminate the need for a water supply to make-up consumption in evaporative cooler EX circuit 206 and/or other components/portions of LAEE 200.

As noted above, LAEE 200 can be used in variety of different environmental conditioning applications, including using scavenger air (e.g., outdoor air) to cool a liquid and delivering the cooled liquid to a heat load. In such liquid cooling examples, evaporative cooler water destination 242 can be a heat load 242. Heat load 242 can be heated air in an enclosed space or heat generating components within the enclosed space, as examples. In such liquid cooling applications of LAEE 200, evaporative cooler EX circuit 206 is configured to evaporatively cool the water flowing through EX circuit 206 using the air. The temperature of the water exiting evaporative cooler EX circuit 206 circuit via L2 outlet 218 is lower than a temperature of the water entering EX circuit 206 via L2 inlet 216. In some examples, therefore, liquid water cooled in evaporative cooler EX circuit 206 can be delivered to a separate liquid or air-cooling system that modulates the temperature of heat load 242, for example, by liquid cooling heat generating components or cooling the heated air within the enclosed space. The water employed in such separate liquid or air-cooling systems associated with the enclosed space can be returned to L2 inlet 216, as indicated by dashed line 248 from heat load 242 to L2 inlet 216.

In one liquid cooling application of LAEE 200, water cooled by and exiting evaporative cooler EX circuit 206 through L2 outlet 218 is transported to heat load 242 via third liquid transport circuit 250, as depicted in FIG. 2A. In an example, heat load 242 is heated air within an enclosed space and cooled water from evaporative cooler EX circuit 206 is transported via third liquid transport circuit 250 is delivered to an air-cooling system associated with the enclosed space. In such an example, the air flowing through LAEE 200 can be scavenger air, which can include outdoor air. The air-cooling system associated with the enclosed space and receiving the cooled water from LAEE 200 can include a process plenum configured to direct process air through a process air inlet and return conditioned process air to the enclosed space through a process air outlet, and a liquid-to-air heat exchanger (LAHX) arranged inside the process plenum. The LAHX includes a liquid inlet connected to and configured to receive the water from third liquid transport circuit 250. And, the LAHX is configured to directly and sensibly cool the process air using the water flowing through the LAHX and received from evaporative cooler EX circuit 206. In operation, the temperature of the conditioned process air exiting the LAHX is lower than the temperature of the air entering the LAHX and thus the air-cooling system including such LAHX can be configured to cool supply/process air to the enclosed space to a set point temperature.

Examples of liquid desiccants usable in LAEE 200 and other LAEEs and systems in accordance with this disclosure include, but are not limited to, hygroscopic polyol based solutions, sulfuric acid and phosphoric acid. Glycerol is an example of a hygroscopic polyol usable herein. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, first membranes 226, 228 and second membranes 230, 232 can be semi-permeable and materials in a gas/vapor phase can pass through the membrane and materials in a liquid or solid phase cannot pass through the membrane. Semi-permeable membranes in examples according to this disclosure can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquid, solids. and vapor/gas of other constituents of the liquid.

In examples, LAEE 200 and other example LAEEs and/or conditioning systems in accordance with this disclosure may include or be associated with one or more system controllers, which are configured to control one or more aspects of operation of LAEE 200. For example, the controller(s) can be configured to manage, control, set, etcetera various parameters of LAEE 200 including supply air set point temperature and/or an amount of cooling capacity provided from LAEE 200 to heat load 242 via water cooled in evaporative cooler EX circuit 206.

The controller(s) can include hardware, software, and combinations thereof to implement the functions attributed to the controller herein. The controller(s) can be an analog, digital, or combination analog and digital controller including a number of components. As examples, the controller(s) can include ICB(s), PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry. Storage devices, in some examples, are described as a computer-readable storage medium. In some examples, storage devices include a temporary memory, meaning that a primary purpose of one or more storage devices is not long-term storage. Storage devices are, in some examples, described as a volatile memory, meaning that storage devices do not maintain stored contents when the computer is turned off. Examples of volatile memories include random access memories (RAM), dynamic random access memories (DRAM), static random access memories (SRAM), and other forms of volatile memories known in the art. The data storage devices can be used to store program instructions for execution by processor(s) of the controller(s). The storage devices, for example, are used by software, applications, algorithms, as examples, running on and/or executed by the controller(s). The storage devices can include short-term and/or long-term memory, and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories.

The controller(s) can be configured to communicate with LAEE 200 and components thereof via various wired or wireless communications technologies and components using various public and/or proprietary standards and/or protocols. For example, a power and/or communications network of some kind may be employed to facilitate communication and control between the controller(s) and LAEE 200. In one example, the controller(s) can communicate with EX circuit 206 via a private or public local area network (LAN), which can include wired and/or wireless elements functioning in accordance with one or more standards and/or via one or more transport mediums. In one example, LAEE 200 can be configured to use wireless communications according to one of the 802.11 or Bluetooth specification sets, or another standard or proprietary wireless communication protocol. Data transmitted to and from components of LAEE 200, including the controller(s), can be formatted in accordance with a variety of different communications protocols. For example, all or a portion of the communications can be via a packet-based, Internet Protocol (IP) network that communicates data in Transmission Control Protocol/Internet Protocol (TCP/IP) packets, over, for example, Category 5, Ethernet cables.

The controller(s) can include one or more programs, circuits, algorithms or other mechanisms for controlling the operation of LAEE 200 or a conditioning system including LAEE 200. A system controller is not specifically shown or discussed with reference to all of the figures for the various examples in accordance with this disclosure. However, it is recognized that the other conditioning systems and LAEEs in accordance with this disclosure can include a system controller that operates in the same or similar manner as that described above.

Figure 3A:
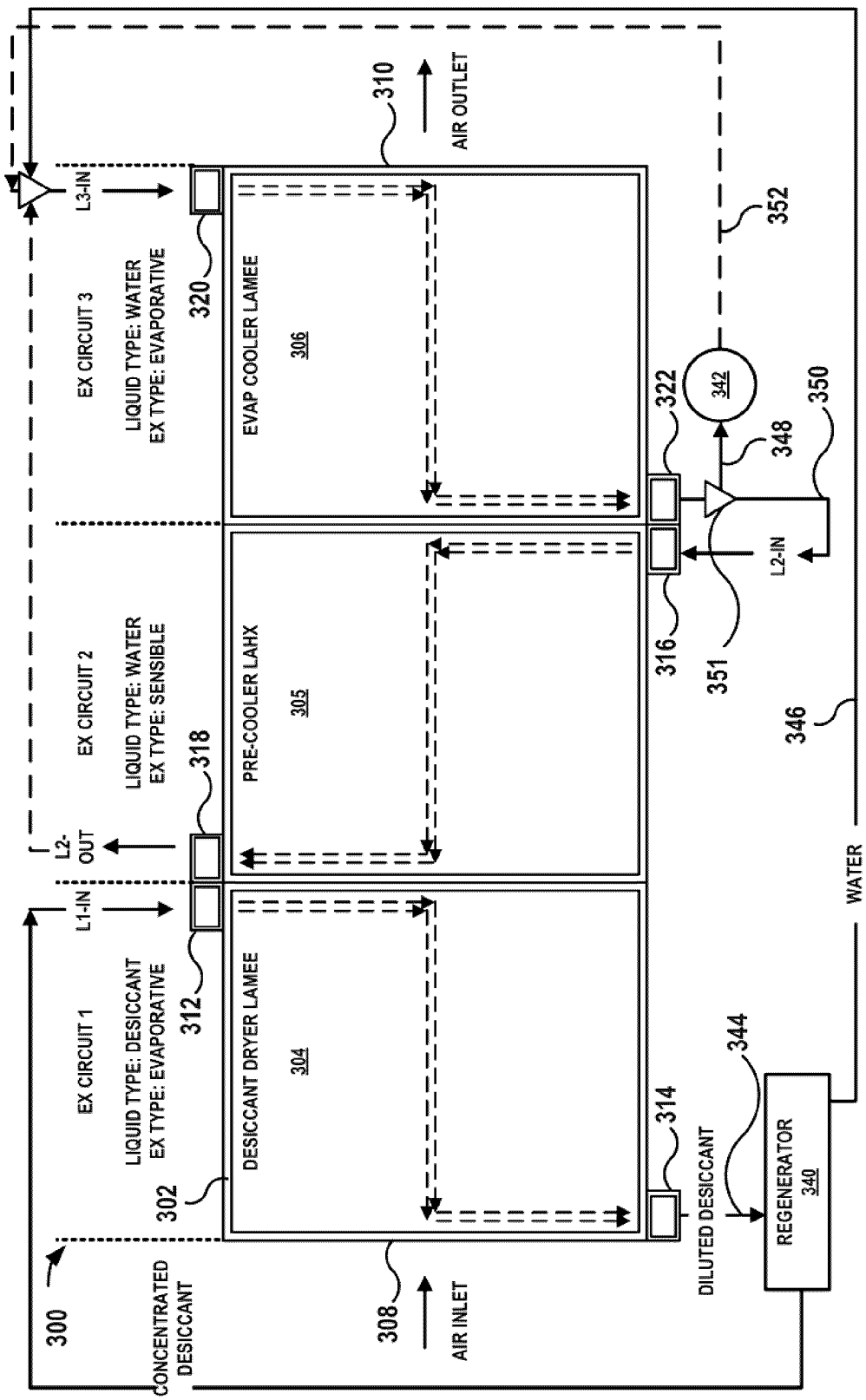
FIGS. 3A and 3B schematically depict another example LAEE in accordance with this disclosure.
Figure 3B:
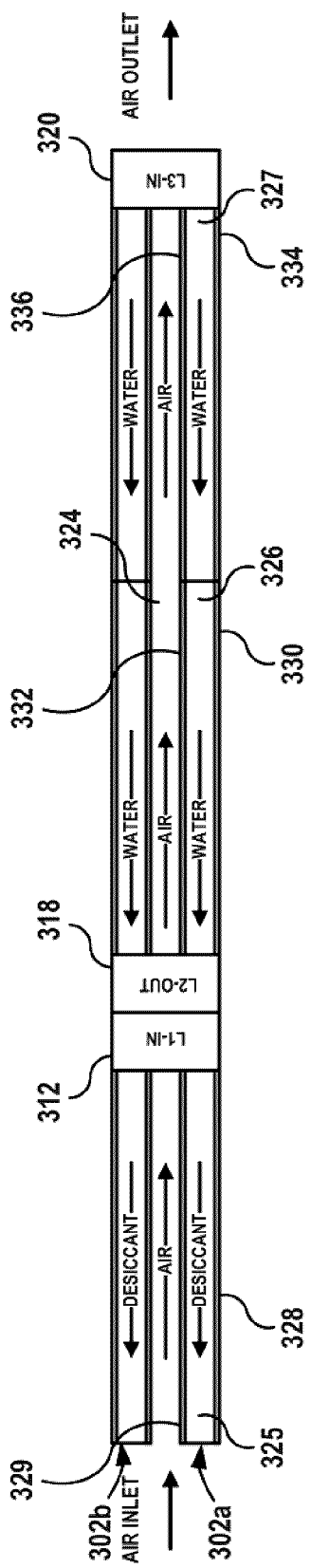

FIGS. 3A and 3B schematically depict example liquid-to-air energy exchanger (LAEE) 300 in accordance with this disclosure. In contrast to the examples of LAEE 100 and LAEE 200, LAEE 300 includes three EX circuits and is composed of a plurality of single liquid panels, each of which includes three liquid circuits corresponding to the EX circuits of LAEE 300. LAEE 300 is the same as LAEE 200 in the sense that LAEE 300 includes desiccant dryer EX circuit 304 and evaporative cooler EX circuit 306, which are physically configured, arranged, and operationally the same or substantially similar to desiccant dryer EX circuit 204 and evaporative cooler EX circuit 206 of LAEE 200. However, LAEE 300 includes the addition of pre-cooler EX circuit 305 interposed between desiccant dryer EX circuit 304 and evaporative cooler EX circuit 306 in a direction of air flow through LAEE 300. The addition of pre-cooler EX circuit 305 in LAEE 300 may boost the conditioning (e.g., cooling) capacity of LAEE 300 relative to LAEE 200 and may therefore allow LAEE 300 to be implemented in a wider variety of environmental conditions.

Referring to FIG. 3A, LAEE 300 includes liquid panel(s) 302, desiccant dryer EX circuit 304, pre-cooler EX circuit 305, evaporative cooler EX circuit 306, air inlet 308, air outlet 310, L1 inlet 312, L1 outlet 314, L2 inlet 316, L2 outlet 318, L3 inlet 320, and L3 outlet 322. LAEE 300 can include a plurality of liquid and air channels stacked side-by-side with an air channel between pairs of liquid channels. Referring to FIG. 3B, which is a plan view schematically depicting air channel 324 between two single liquid panels 302a and 302b. Each liquid panel 302a and 302b has first liquid circuit 325, second liquid circuit 326, and third liquid circuit 327, through each of which a liquid is configured to flow. As with the example of FIGS. 1A-1C, each of first liquid circuit 325, second liquid circuit 326, and third liquid circuit 327 has a plurality of closed liquid channels through each of which a liquid is configured to flow without mixing with the liquid flowing through other of the plurality of closed liquid channels. Each of first liquid circuit 325, second liquid circuit 326, and third liquid circuit 327 corresponds to each of desiccant dryer EX circuit 304, pre-cooler EX circuit 305, and evaporative cooler EX circuit 306.

Air channel 324 is adjacent the two single liquid panels 302a and 302b. Air channel 324 extends adjacent all of the plurality of liquid circuits of liquid panels 302a and 302b, including first liquid circuit 325, second liquid circuit 326, and third liquid circuit 327. Air flows through air channel 324 from air inlet 308 to air outlet 310 of LAEE 300.

A number of membranes are connected to each of single liquid panels 302a and 302b. Referring to FIG. 3B, liquid panel 302a includes a pair of first membranes 328 and 329, which are connected to either side of and encloses first liquid circuit 325. Liquid panel 302a also includes a pair of second membranes 330 and 332, which are connected to either side of and encloses second liquid circuit 326. Additionally, liquid panel 302a includes a pair of third membranes 334 and 336, which are connected to either side of and encloses third liquid circuit 327.

First membranes 328 and 329 are disposed between first liquid circuit 325 and a pair of air channels (only one of the pair, air channel 324 shown in FIG. 3B) and form a barrier between a first liquid (L1) flowing through first liquid circuit 325 and air flowing through the air channels, e.g. air channel 324. Similarly, second membranes 330 and 332 are disposed between second liquid circuit 326 and a pair of air channels (only one of the pair, air channel 324 shown in FIG. 3B) and form a barrier between a second liquid (L2) flowing through second liquid circuit 326 and air flowing through the air channels, e.g. air channel 324. And, third membranes 334 and 336 are disposed between third liquid circuit 327 and a pair of air channels (only one of the pair, air channel 324 shown in FIG. 3B) and form a barrier between a third liquid (L3) flowing through third liquid circuit 327 and air flowing through the air channels, e.g. air channel 324.

Each of desiccant dryer EX circuit 304, pre-cooler EX circuit 305, and evaporative cooler EX circuit 306 corresponds to each of first liquid circuit 325, second liquid circuit 326, and third liquid circuit 327 and each EX circuit is configured to exchange at least one of latent and sensible energy between a liquid flowing through the respective liquid circuit and the air flowing through air channel 324.

In the example of FIGS. 3A and 3B, first liquid circuit 325 circulates a liquid desiccant from L1 inlet 312 to L1 outlet 314 and first EX circuit 304 includes semi-permeable membranes 328, 329 to configure the first EX circuit as a desiccant dryer liquid-to-air semi-permeable membrane energy exchanger (LAMEE). In this example, the liquid desiccant flowing through first liquid circuit 325 absorbs water from the air flowing through first EX circuit 304 such that a moisture content of the air exiting the first EX circuit is lower than a moisture content of the air entering the first EX circuit.

Second liquid circuit 326, as an example, circulates water from L2 inlet 316 to L2 outlet 318 and second EX circuit 305 includes impermeable membranes 330, 332 to configure the second EX circuit as a liquid-to-air heat exchanger (LAHX). The water flowing through pre-cooler EX circuit 305 sensibly cools the air flowing through EX circuit 305 such that the temperature of the air entering pre-cooler EX circuit 305 is higher than the temperature of the air exiting EX circuit 305.

Third liquid circuit 327, as an example, circulates water from L3 inlet 320 to L3 outlet 322 and third EX circuit 306 includes semi-permeable third membranes 334 and 336 to configure the third EX circuit as an evaporative cooler LAMEE. Evaporative cooler EX circuit 306 can evaporatively cool at least one of the water and the air flowing through EX circuit 306 such that a temperature of the at least one of the water and the air exiting evaporative cooler EX circuit 306 is lower than a temperature of the at least one of the water and the air entering evaporative cooler EX circuit 306.

This example of LAEE 300 in which first EX circuit 304 is a desiccant dryer, second EX circuit 305 is a pre-cooler LAHX, and third EX circuit 306 is an evaporative cooler could enhance the cooling capacity of prior LAEE designs with a liquid panel including only one liquid circuit corresponding to the single EX circuit of such prior LAEEs. Additionally, example LAEE 300 may further boost conditioning capacity (e.g., cooling capacity) relative to example LAEE 200 through additional sensible cooling the air using pre-cooler EX circuit 305.

Referring again to FIG. 3A, LAEE 300 is fluidically connected to desiccant regenerator 340 and evaporative cooler water destination 342. Additionally, LAEE 300 includes first liquid transport circuit 344, second liquid transport circuit 346, third liquid transport circuit 348, and fourth liquid transport circuit 350. The configuration and operation of regenerator 340 is the same or substantially similar to regenerator 240 of example LAEE 200 and therefore will not be described again in detail with reference to LAEE 300. Additionally, first liquid transport circuit 344 and second liquid transport circuit 346 of LAEE 300 are the same or substantially similar to first liquid transport circuit 244 and second liquid transport circuit 246 of LAEE 200 and third liquid transport circuit 348 of LAEE 300 is the same or substantially similar to third liquid transport circuit 250 of LAEE 200. Fourth liquid transport circuit 350 of LAEE 300 transports at least a portion of conditioned water exiting evaporative cooler EX circuit 306 at L3 outlet 322 to L2 inlet 316 of pre-cooler EX circuit 305. Valve 351 may be employed at a junction between third liquid transport circuit 348 and fourth liquid transport circuit 350 to modulate the amount of conditioned water from evaporative cooler EX circuit 306 is delivered to, e.g., a heat load 342 and how much water is delivered to pre-cooler EX circuit 305. Additionally, as described with reference to example LAEE 200, fourth liquid transport circuit 350 (and other liquid transport circuits) may include additional components like, e.g., pumps and liquid reservoirs in which water is stored, mixed, and/or maintained at various set point conditions and delivered from the reservoir to various destinations including pre-cooler EX circuit 305 and water destination 342.

LAEE 300 can be used in variety of different environmental conditioning applications, including commercial and industrial, as well as residential applications. In one example, LAEE 300 can be used for cooling air in an enclosed space, which is hot because of surrounding equipment and conditions in the space. In an example of LAEE 300 implemented as a direct evaporative cooler for cooling air within an enclosed space, e.g. a data center, LAEE 300 can define or can be housed in a cabinet that defines a process air plenum. In such an application, LAEE 300 can receive process air, in some cases hot return air from the enclosed space and condition the process air such that it can be returned to the enclosed space as reduced-temperature and/or reduced-humidity supply air.

In air cooling applications of LAEE 300, evaporative cooler water destination 342 can be L3 inlet 320 or a water reservoir that is connected to L3 inlet 320. In such cases, the water exiting evaporative cooler EX circuit 306 at L3 outlet 322 can be recirculated back to evaporative cooler EX circuit 306 after the water has been used to cool (and otherwise condition) the air flowing through EX circuit 306 and supplied to the enclosed space via air outlet 310. The water exiting evaporative cooler EX circuit 306 at L3 outlet 322 can be mixed with water from a water supply, e.g., a cooled water supply that when mixed with water exiting EX circuit 306 effectively cools the water exiting EX circuit 306 to an acceptable inlet water temperature. Additionally, the water exiting evaporative cooler EX circuit 306 at L3 outlet 322 can be mixed with water recovered from the diluted desiccant regenerated in regenerator 340 and transported to L3 inlet 320 or a reservoir connected thereto via second liquid transport circuit 346.

As with example LAEE 200, LAEE 300 can be used in a liquid cooling application in which scavenger air (e.g., outdoor air) flowing through LAEE 300 is used to cool a liquid that is then delivered to a heat load. In such liquid cooling examples, evaporative cooler water destination 342 can be a heat load 342. Heat load 342 can be heated air in an enclosed space or heat generating components within the enclosed space, as examples. In such liquid cooling applications of LAEE 300, evaporative cooler EX circuit 306 is configured to evaporatively cool the water flowing through EX circuit 306 using the air and liquid water cooled in evaporative cooler EX circuit 306 can be delivered to a separate liquid or air-cooling system that modulates the temperature of heat load 342, for example, by liquid cooling heat generating components or cooling the heated air within the enclosed space. The water employed in such separate liquid or air-cooling systems associated with the enclosed space can be returned to L3 inlet 320, as indicated by dashed line 352 from heat load 342 to L3 inlet 320.

The configuration, functions, operation, etcetera of LAEE 300 in liquid cooling applications can be the same or substantially similar to that of example LAEE 200. However, as noted above, the addition of pre-cooler EX circuit 305 between desiccant dryer EX circuit 304 and evaporative cooler EX circuit 306 may boost the cooling capacity of LAEE 300 in general and in particular may enable evaporative cooler EX circuit 306 to condition the water exiting EX circuit 306 to a wider range of desired set point temperatures. As noted above, pre-cooler EX circuit 305 includes second impermeable membranes 330 and 332 and is configured as an LAHX that is configured to sensibly cool the air exiting desiccant dryer EX circuit 304 and deliver the cooled air to evaporative cooler EX circuit 306.

Figure 3C:
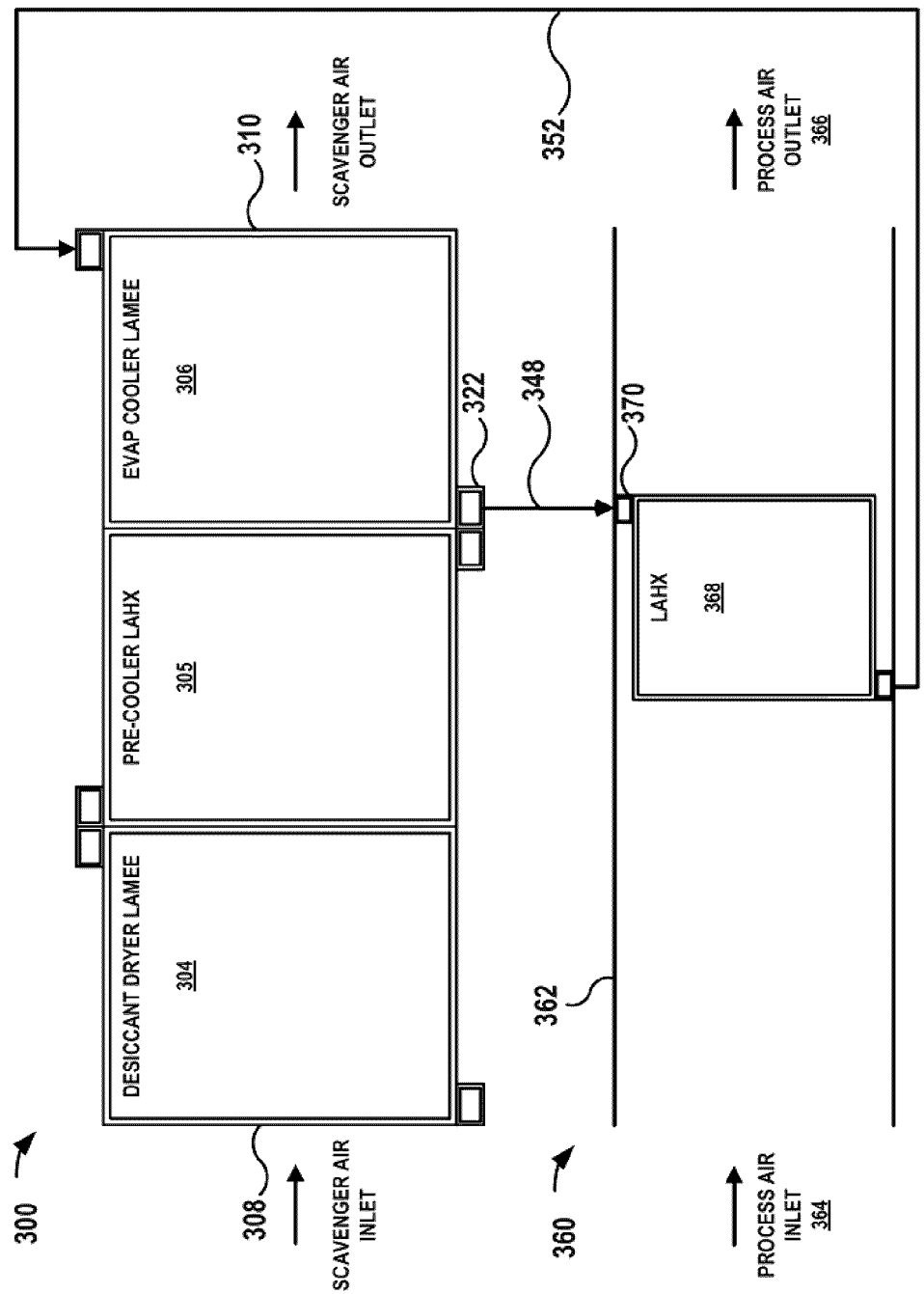
FIG. 3C depicts an example air cooling system employed in conjunction with the example LAEE 300 of FIGS. 3A and 3B.

In one liquid cooling application of LAEE 300, water cooled by and exiting evaporative cooler EX circuit 306 through L3 outlet 322 is transported to heat load 342 via third liquid transport circuit 348, as depicted in FIG. 3A. In an example, heat load 342 is heated air within an enclosed space and cooled water from evaporative cooler EX circuit 306 is transported via third liquid transport circuit 348 is delivered to an air-cooling system associated with the enclosed space. Referring to FIG. 3C, the air flowing through LAEE 300 can be scavenger air, which can include outdoor air. Air-cooling system 360 associated with the enclosed space and receiving the cooled water from LAEE 300 can include process plenum 362 configured to direct process air through process air inlet 364 and return conditioned process air to the enclosed space through process air outlet 366, and liquid-to-air heat exchanger (LAHX) 368 arranged inside the process plenum. LAHX 368 includes liquid inlet 370 connected to and configured to receive the water from third liquid transport circuit 348. And, LAHX 368 is configured to directly and sensibly cool the process air using the water flowing through the LAHX and received from evaporative cooler EX circuit 306. In operation, the temperature of the conditioned process air exiting LAHX 368 of air cooling system 360 associate with the enclosed space is lower than the temperature of the air entering the LAHX and thus the air-cooling system including such LAHX can be configured to cool supply/process air to the enclosed space to a set point temperature.

The example air cooling system 360 employed in conjunction with LAEE 300 as depicted in FIG. 3C can be employed with other examples according to this disclosure, including LAEE 100, 200, 400, 500, 600, and 700. However, for simplicity and to reduce redundancy, the details of the combination of example LAEE/conditioning system including example LAEE and air-cooling system will not be described with reference to all of the example LAEEs/conditioning system including example LAEEs described in this disclosure.

Figure 3D:
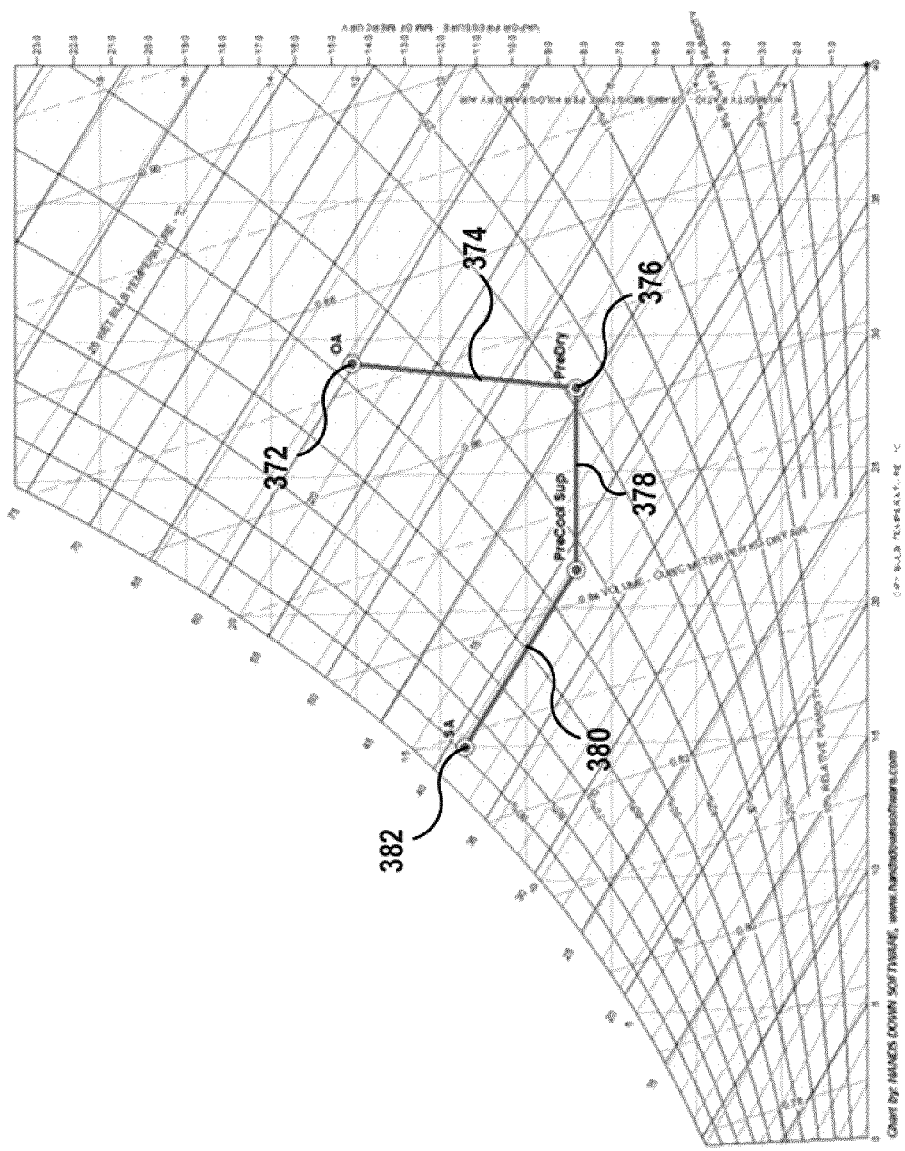
FIG. 3D is a psychometric chart depicting the conditioning of air entering the example LAEE of FIGS. 3A and 3B.

FIG. 3D is a psychometric chart depicting the conditioning of air entering an example LAEE similar to LAEE 300 (also applicable to LAEE similar to LAEE 501 of FIGS. 5A-5C), including a desiccant dryer EX circuit, pre-cooler EX circuit, and an evaporative cooler EX circuit. In FIG. 3D, air, which may be outdoor air (OA), enters the desiccant dryer EX circuit of the example LAEE at point 372. The desiccant dryer EX circuit lowers the humidity of and marginally lowers the temperature of the air along 374. The air then enters the pre-cooler EX circuit at point 376 and the pre-cooler LAHX sensibly cools the air (lowers the temperature but does not alter the humidity of the air) along 378. Finally, the air enters the evaporative cooler EX circuit at point 380 and the evaporative cooler EX circuit evaporatively cools the air using water. The evaporative cooler EX circuit lowers the temperature and increases the humidity of the air, which exits the LAEE at point 382. The characteristic values associated with the process diagram of FIG. 3D are as follows:

TABLE 1

| Example sizing for 1.5 ton cooling system | | | | | | |
|---|---|---|---|---|---|---|
| | Primary Cooling Stage Desiccant Dryer LAMEE | | Intermediate Cooling Stage LAHX | | Final Cooling Stage DEC LAMEE | |
| | SI | IP | SI | IP | SI | IP |
| Plate Height | 460 mm | 18.1 in | 460 mm | 18.1 in. | 460 mm | 18.1 in. |
| Plate Length | 400 mm | 15.7 in. | 410 mm | 16.1 in. | 410 mm | 16.1 in. |
| # of Plates | 80 | 80 | 80 | 80 | 56 | 56 |
| Air Channel Width | 3.6 mm | 0.142 in. | 3.6 mm | 0.142 in. | 3.6 mm | 0.142 in. |
| Liquid Channel Width | 1.8 mm | 0.071 in. | 1.8 mm | 0.071 in. | 1.8 mm | 0.071 in. |
| Stack Width | 435.6 mm | 17.1 in. | 435.6 mm | 17.1 in. | 306 mm | 12.0 in. |
| Transfer Surface Area | 21.76 sq. m | 234 sq. ft | 22.4 sq. m | 241 sq. ft | 15.68 sq. m | 169 sq. ft |

TABLE 1-continued

Example sizing for 1.5 ton cooling system

| | Primary Cooling Stage Desiccant Dryer LAMEE | | Intermediate Cooling Stage LAHX | | Final Cooling Stage DEC LAMEE | |
|---|---|---|---|---|---|---|
| | SI | IP | SI | IP | SI | IP |
| Inlet | | | | | | |
| Airflow | 401 S.L/s | 850 SCFM | 401 S.L/s | 850 SCFM | 283 S.L/s | 600 SCFM |
| Air Temperature | 29.1 C. | 84.4 F. | 28.1 C. | 82.6 F. | 21.4 C. | 70.5 F. |
| Air Humidity Ratio | 12.1 g/kg | 0.0121 lb/lb | 6.82 g/kg | 0.00682 lb/lb | 6.82 g/kg | 0.00682 lb/lb |
| Liquid Flow | 0.473 L/s | 7.5 GPM | 0.158 L/s | 2.5 GPM | 0.126 L/s | 2 GPM |
| Liquid Temperature | 27 C. | 80.6 F. | 19.7 C. | 67.5 F. | 14.58 C. | 58.2 F. |
| Salt Mass Concentration | 38% | 38% | 0% | 0% | 0% | 0% |
| Outlet | | | | | | |
| Air Temperature | 28.1 C. | 82.6 F | 21.4 C. | 70.5 F. | 15 C. | 59 F. |
| Air Humidity Ratio | 6.82 g/kg | 0.00682 lb/lb | 6.82 g/kg | 0.00682 lb/lb | 9.43 g/kg | 0.00943 lb/lb |
| Liquid Temperature | 31 C. | 87.8 F. | 24.6 C. | 76.3 F. | 14.58 C. | 58.2 F. |
| Salt Mass Concentration | 37.8% | 37.8% | 0% | 0% | 0% | 0% |
| Sensible Energy | −503 W | −1716 BTU/hr | −3284 W | −112.05 BTU/hr | −2224 W | −7588 BTU/hr |
| Latent Energy | −6480 W | −22110 BTU/hr | 0 W | 0 BTU/hr | 2277 W | 7769 BTU/hr |
| Total Energy | −6983 W | −23826 BTU/hr | −3284 W | −11205 BTU/hr | 52 W | 177 BTU/hr |
| Moisture Change | −9.1 kg/hr | −20.0 lbs/hr | 0 kg/hr | 0.0 lbs/hr | 3.2 kg/hr | 7.0 lbs/hr |

Examples of liquid desiccants usable in LAEE 300 and other LAEEs and systems in accordance with this disclosure include, but are not limited to, hygroscopic polyol based solutions, sulfuric acid and phosphoric acid. Glycerol is an example of a hygroscopic polyol. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, first membranes 328 and 329 and third membranes 334 and 336 can be semi-permeable and materials in a gas/vapor phase can pass through the membrane and materials in a liquid or solid phase cannot pass through the membrane. Semi-permeable membranes in examples according to this disclosure can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquid and vapor/gas of other constituents of the liquid.

Figure 4A:
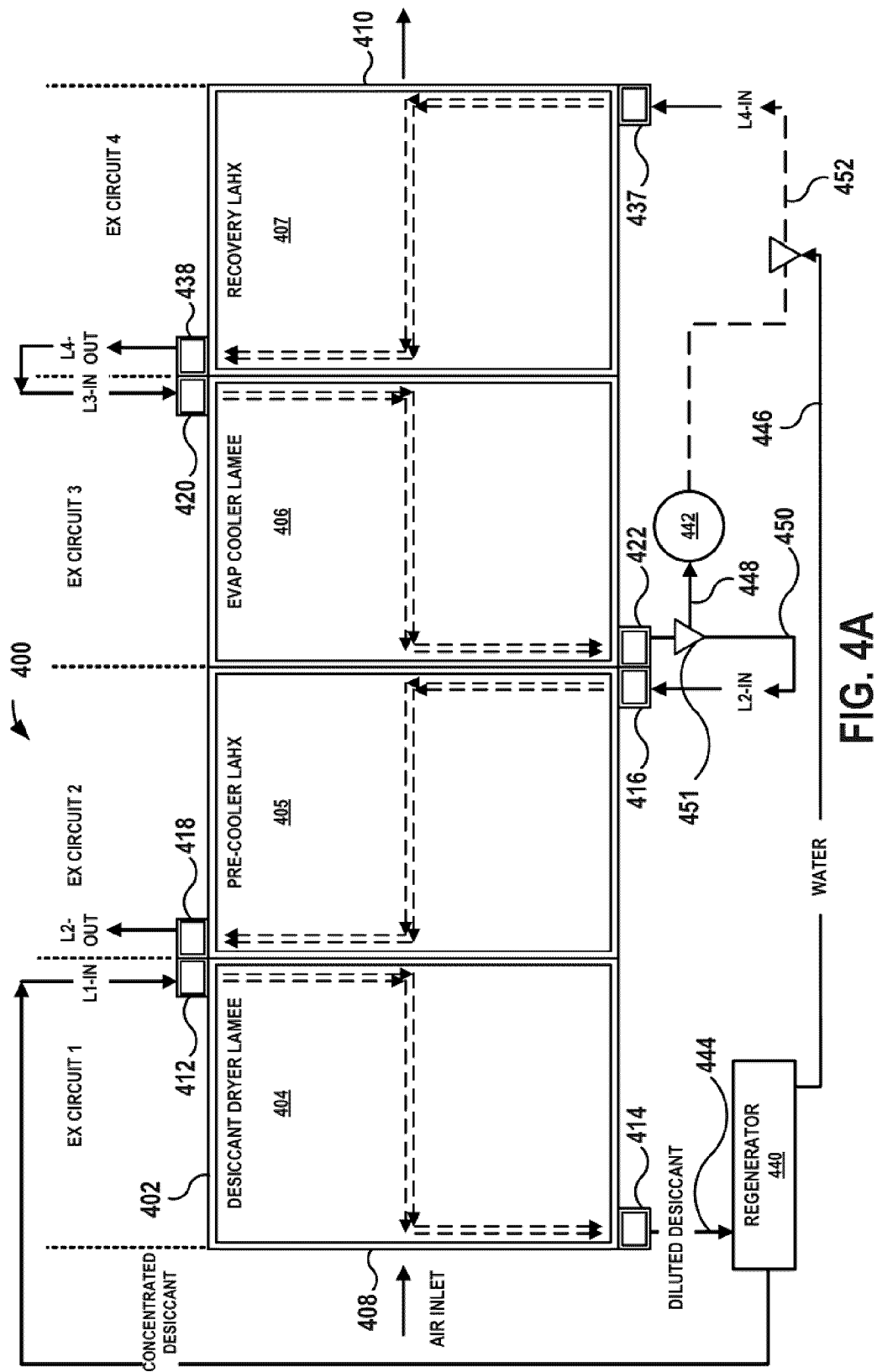
FIGS. 4A and 4B schematically another example LAEE in accordance with this disclosure.
Figure 4B:
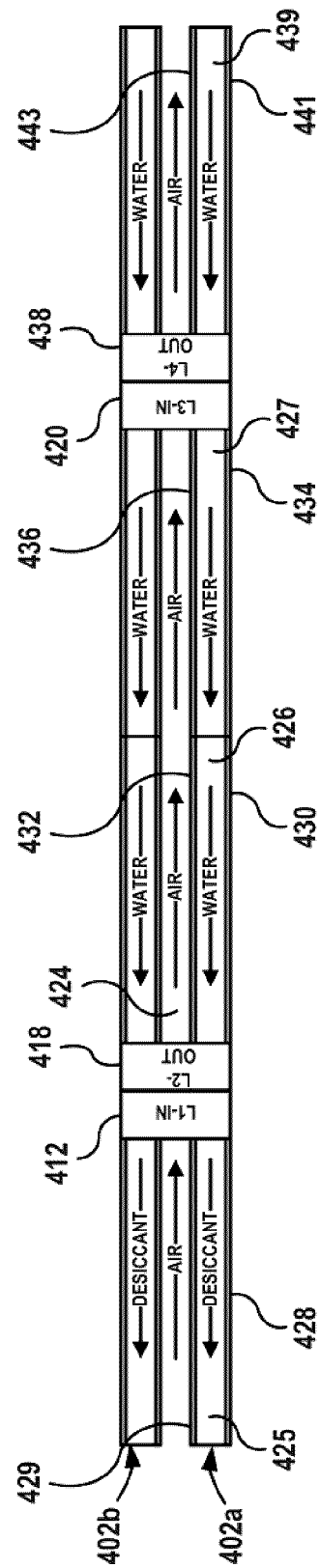

FIGS. 4A and 4B schematically depict example liquid-to-air energy exchanger (LAEE) 400 in accordance with this disclosure. In comparison to the examples of LAEE 100, LAEE 200, and LAEE 300, LAEE 400 includes four EX circuits in series and is composed of a plurality of single liquid panels, each of which includes four liquid circuits corresponding to the EX circuits of LAEE 400. LAEE 400 is the same as LAEE 300 in the sense that LAEE 400 includes desiccant dryer EX circuit 404, pre-cooler EX circuit 405, and evaporative cooler EX circuit 406, which are physically configured, arranged, and operationally the same or substantially similar to desiccant dryer EX circuit 304, pre-cooler EX circuit 305, and evaporative cooler EX circuit 306 of LAEE 300. However, LAEE 400 includes the addition of recovery EX circuit 407 downstream of evaporative cooler EX circuit 406 in a direction of air flow through LAEE 400. The addition of recovery EX circuit 407 in LAEE 400 can enable sensible cooling of water exiting evaporative cooler EX circuit 406 or water returning to LAEE 400 from a heat load (e.g., air and/or equipment heat from enclosed space).

Referring to FIG. 4A, LAEE 400 includes liquid panel(s) 402, desiccant dryer EX circuit 404, pre-cooler EX circuit 405, evaporative cooler EX circuit 406, recovery EX circuit 407, air inlet 408, air outlet 410, L1 inlet 412, L1 outlet 414, L2 inlet 416, L2 outlet 418, L3 inlet 420, L3 outlet 422, L4 inlet 437, and L4 outlet 438. LAEE 400 can include a plurality of liquid and air channels stacked side-by-side with an air channel between pairs of liquid channels. Referring to FIG. 4B, which is a plan view schematically depicting air channel 424 between two single liquid panels 402a and 402b. Each liquid panel 402a and 402b has first liquid circuit 425, second liquid circuit 426, third liquid circuit 427, and fourth liquid circuit 439, through each of which a liquid is configured to flow. As with the example of FIGS. 1A-1C, each of first liquid circuit 425, second liquid circuit 426, third liquid circuit 427, and fourth liquid circuit 439 has a plurality of closed liquid channels through each of which a liquid is configured to flow without mixing with the liquid flowing through other of the plurality of closed liquid channels. Each of first liquid circuit 425, second liquid circuit 426, third liquid circuit 427, and fourth liquid circuit 439 corresponds to each of desiccant dryer EX circuit 404, pre-cooler EX circuit 405, evaporative cooler EX circuit 406, and recovery EX circuit 407.

Air channel 424 is adjacent the two single liquid panels 402a and 402b. Air channel 424 extends adjacent all of the plurality of liquid circuits of liquid panels 402a and 402b, including first liquid circuit 425, second liquid circuit 426, third liquid circuit 427, and fourth liquid circuit 439. Air flows through air channel 424 from air inlet 410 to air outlet 412 of LAEE 400.

A number of membranes are connected to each of single liquid panels 402a and 402b. Referring to FIG. 4B, liquid panel 402a includes a pair of first membranes 428 and 429, which are connected to either side of and encloses first liquid circuit 425. Liquid panel 402a also includes a pair of second membranes 430 and 432, which are connected to either side of and encloses second liquid circuit 426. Additionally, liquid panel 402a includes a pair of third membranes 434 and 436, which are connected to either side of and encloses third liquid circuit 427. Finally, liquid panel 402a includes a pair of fourth membranes 441 and 443, which are connected to either side of and encloses fourth liquid circuit 439.

First membranes 428 and 429 are disposed between first liquid circuit 425 and a pair of air channels (only one of the pair, air channel 424 shown in FIG. 4B) and form a barrier between a first liquid (L1) flowing through first liquid circuit 425 and air flowing through the air channels, e.g. air channel 424. Similarly, second membranes 430 and 432 are disposed between second liquid circuit 426 and a pair of air channels (only one of the pair, air channel 424 shown in FIG. 4B) and form a barrier between a second liquid (L2) flowing through second liquid circuit 426 and air flowing through the air channels, e.g. air channel 424. Third membranes 434 and 436 are disposed between third liquid circuit 427 and a pair of air channels (only one of the pair, air channel 424 shown in FIG. 4B) and form a barrier between a third liquid (L3) flowing through third liquid circuit 427 and air flowing through the air channels, e.g. air channel 424. And, fourth membranes 441 and 443 are disposed between fourth liquid circuit 439 and a pair of air channels (only one of the pair, air channel 424 shown in FIG. 4B) and form a barrier between a fourth liquid (L4) flowing through fourth liquid circuit 439 and air flowing through the air channels, e.g. air channel 424.

Each of desiccant dryer EX circuit 404, pre-cooler EX circuit 405, evaporative cooler EX circuit 406, recovery EX circuit 407 corresponds to each of first liquid circuit 425, second liquid circuit 426, third liquid circuit 427, and fourth liquid circuit 439 and each EX circuit is configured to exchange at least one of latent and sensible energy between a liquid flowing through the respective liquid circuit and the air flowing through air channel 424.

In the example of FIGS. 4A and 4B, first liquid circuit 425 circulates a liquid desiccant from L1 inlet 412 to L1 outlet 414 and first EX circuit 404 includes semi-permeable membranes 428, 429 to configure the first EX circuit as a desiccant dryer liquid-to-air semi-permeable membrane energy exchanger (LAMEE). In this example, the liquid desiccant flowing through first liquid circuit 425 absorbs water from the air flowing through first EX circuit 404 such that a moisture content of the air exiting the first EX circuit is lower than a moisture content of the air entering the first EX circuit.

Second liquid circuit 426, as an example, circulates water from L2 inlet 416 to L2 outlet 418 and second EX circuit 405 includes impermeable membranes 430, 432 to configure the second EX circuit as a liquid-to-air heat exchanger (LAHX).

The water flowing through pre-cooler EX circuit 405 sensibly cools the air flowing through EX circuit 405 such that the temperature of the air entering pre-cooler EX circuit 405 is higher than the temperature of the air exiting EX circuit 405.

Third liquid circuit 427, as an example, circulates water from L3 inlet 420 to L3 outlet 422 and third EX circuit 406 includes semi-permeable third membranes 434 and 436 to configure the third EX circuit as an evaporative cooler LAMEE. Evaporative cooler EX circuit 406 can evaporatively cool at least one of the water and the air flowing through EX circuit 406 such that a temperature of the at least one of the water and the air exiting evaporative cooler EX circuit 406 is lower than a temperature of the at least one of the water and the air entering evaporative cooler EX circuit 406.

Fourth liquid circuit 439, as an example, circulates water from L4 inlet 437 to L4 outlet 438 and recovery EX circuit 407 includes impermeable membranes 441, 443 to configure the fourth EX circuit as a liquid-to-air heat exchanger (LAHX). The air flowing through recovery EX circuit 407 sensibly cools the water flowing through EX circuit 407 such that the temperature of the water entering recovery EX circuit 407 is higher than the temperature of the water exiting EX circuit 407.

Referring again to FIG. 4A, LAEE 400 is fluidically connected to desiccant regenerator 440 and evaporative cooler water destination 442. Additionally, LAEE 400 includes first liquid transport circuit 444, second liquid transport circuit 446, third liquid transport circuit 448, and fourth liquid transport circuit 450. The configuration and operation of regenerator 440 is the same or substantially similar to regenerator 240 of example LAEE 200 and therefore will not be described again in detail with reference to LAEE 400. Additionally, first liquid transport circuit 444 is the same or substantially similar to first liquid transport circuit 244 of LAEE 200 and third liquid transport circuit 448 of LAEE 400 is the same or substantially similar to third liquid transport circuit 250 of LAEE 200.

Second liquid transport circuit 446 of LAEE 400 is connected to a liquid outlet of regenerator 440 and transports at least a portion of the water removed from the liquid desiccant by regenerator 440 to L4 inlet 437 of evaporative cooler EX circuit 406. Fourth liquid transport circuit 450 of LAEE 400 transports at least a portion of conditioned water exiting evaporative cooler EX circuit 406 at L3 outlet 422 to L2 inlet 416 of pre-cooler EX circuit 405. Valve 451 may be employed at a junction between third liquid transport circuit 448 and fourth liquid transport circuit 450 to modulate the amount of conditioned water from evaporative cooler EX circuit 406 delivered to, e.g., a heat load 442 and how much water is delivered to pre-cooler EX circuit 405. Additionally, as described with reference to example LAEE 200 and LAEE 300, fourth liquid transport circuit 450 (and other liquid transport circuits) may include additional components like, e.g., pumps and liquid reservoirs in which water is stored, mixed, and/or maintained at various set point conditions and delivered from the reservoir to various destinations including pre-cooler EX circuit 405 and water destination 442.

LAEE 400 also includes fifth liquid transport circuit 452. In liquid cooling examples in which evaporative cooler EX circuit 406 delivers cooled water to heat load 442, e.g. a separate air or liquid cooling system associated with an enclosed space, fifth liquid transport circuit 452 can deliver heated water from heat load 442 to L4 inlet 437 of recovery EX circuit 407 and recovery EX circuit 407 can use air flowing through recovery EX circuit 407 (scavenger air in this application of LAEE 400) to sensibly cool the water heated by heat load 442. In air cooling examples in which LAEE 400 is configured to condition and deliver process air via air outlet 410 to an enclosed space, however, third liquid transport circuit 448 and fifth liquid transport circuit 452 may essentially be combined into on circuit, which delivers water from L3 outlet 422 of evaporative cooler EX circuit 406 to L4 inlet 437 of recovery EX circuit 407.

LAEE 400 can be used in variety of different environmental conditioning applications, including commercial and industrial, as well as residential applications. In one example, LAEE 400 can be used for cooling air in an enclosed space, which is hot because of surrounding equipment and conditions in the space. In an example of LAEE 400 implemented as a direct evaporative cooler for cooling air within an enclosed space, e.g. a data center, LAEE 400 can define or can be housed in a cabinet that defines a process air plenum. In such an application, LAEE 400 can receive process air, in some cases hot return air from the enclosed space and condition the process air such that it can be returned to the enclosed space as reduced-temperature and/or reduced-humidity supply air.

In air cooling applications of LAEE 400, evaporative cooler water destination 442 can be L4 inlet 437 of recovery EX circuit 407 or a water reservoir that is connected to L4 inlet 437. The water exiting evaporative cooler EX circuit 406 at L3 outlet 422 can be mixed with water from a water supply, e.g., a cooled water supply that when mixed with water exiting EX circuit 406 effectively cools the water exiting EX circuit 406 to a temperature acceptable to the cooling capacity of recovery EX circuit 407. Additionally, the water exiting evaporative cooler EX circuit 406 at L3 outlet 422 can be mixed with water recovered from the diluted desiccant regenerated in regenerator 440 and transported to L4 inlet 437 or a reservoir connected thereto via second liquid transport circuit 446.

As with example LAEEs 200 and 300, LAEE 400 can be used in a liquid cooling application in which scavenger air (e.g., outdoor air) flowing through LAEE 400 is used to cool a liquid that is then delivered to a heat load. In such liquid cooling examples, evaporative cooler water destination 442 can be a heat load 442. Heat load 442 can be heated air in an enclosed space or heat generating components within the enclosed space, as examples. In such liquid cooling applications of LAEE 400, evaporative cooler EX circuit 406 is configured to evaporatively cool the water flowing through EX circuit 406 using the air and liquid water cooled in evaporative cooler EX circuit 406 can be delivered to a separate liquid or air-cooling system that modulates the temperature of heat load 442, for example, by liquid cooling heat generating components or cooling the heated air within the enclosed space. The water employed in such separate liquid or air-cooling systems associated with the enclosed space can be returned to L3 inlet 420, as indicated by dashed line 452 from heat load 442 to L3 inlet 420.

The configuration, functions, operation, etcetera of LAEE 400 in liquid cooling applications can be the same or substantially similar to that of example LAEE 200. However, as noted above, the addition of pre-cooler EX circuit 405 between desiccant dryer EX circuit 404 and evaporative cooler EX circuit 406 may boost the cooling capacity of LAEE 400 in general and in particular may enable evaporative cooler EX circuit 406 to condition the water exiting EX circuit 406 to a wider range of desired set point temperatures. And, additionally, LAEE 400 includes recovery EX circuit 407, which can enable sensible cooling of water exiting evaporative cooler EX circuit 406 or water returning to LAEE 400 from heat load 442 (e.g., air and/or equipment heat from enclosed space).

In one liquid cooling application of LAEE 400, water cooled by and exiting evaporative cooler EX circuit 406 through L3 outlet 422 is transported to heat load 442 via third liquid transport circuit 448, as depicted in FIG. 4A. In an example, heat load 442 is heated air within an enclosed space and cooled water from evaporative cooler EX circuit 406 is transported via third liquid transport circuit 448 is delivered to an air-cooling system associated with the enclosed space. In such an example, the air flowing through LAEE 400 can be scavenger air, which can include outdoor air. The air-cooling system associated with the enclosed space and receiving the cooled water from LAEE 400 can include a process plenum configured to direct process air through a process air inlet and return conditioned process air to the enclosed space through a process air outlet, and a liquid-to-air heat exchanger (LAHX) arranged inside the process plenum. The LAHX includes a liquid inlet connected to and configured to receive the water from third liquid transport circuit 450. And, the LAHX is configured to directly and sensibly cool the process air using the water flowing through the LAHX and received from evaporative cooler EX circuit 406. In operation, the temperature of the conditioned process air exiting the LAHX is lower than the temperature of the air entering the LAHX and thus the air-cooling system including such LAHX can be configured to cool supply/process air to the enclosed space to a set point temperature.

Examples of liquid desiccants usable in LAEE 400 and other LAEEs and systems in accordance with this disclosure include, but are not limited to, hygroscopic polyol based solutions, sulfuric acid and phosphoric acid. Glycerol is an example of a hygroscopic polyol usable herein. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, first membranes 428 and 429 and third membranes 434 and 436 can be semi-permeable and materials in a gas/vapor phase can pass through the membrane and materials in a liquid or solid phase cannot pass through the membrane. Semi-permeable membranes in examples according to this disclosure can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquid, solids, and vapor/gas of other constituents of the liquid.

Figure 5A:
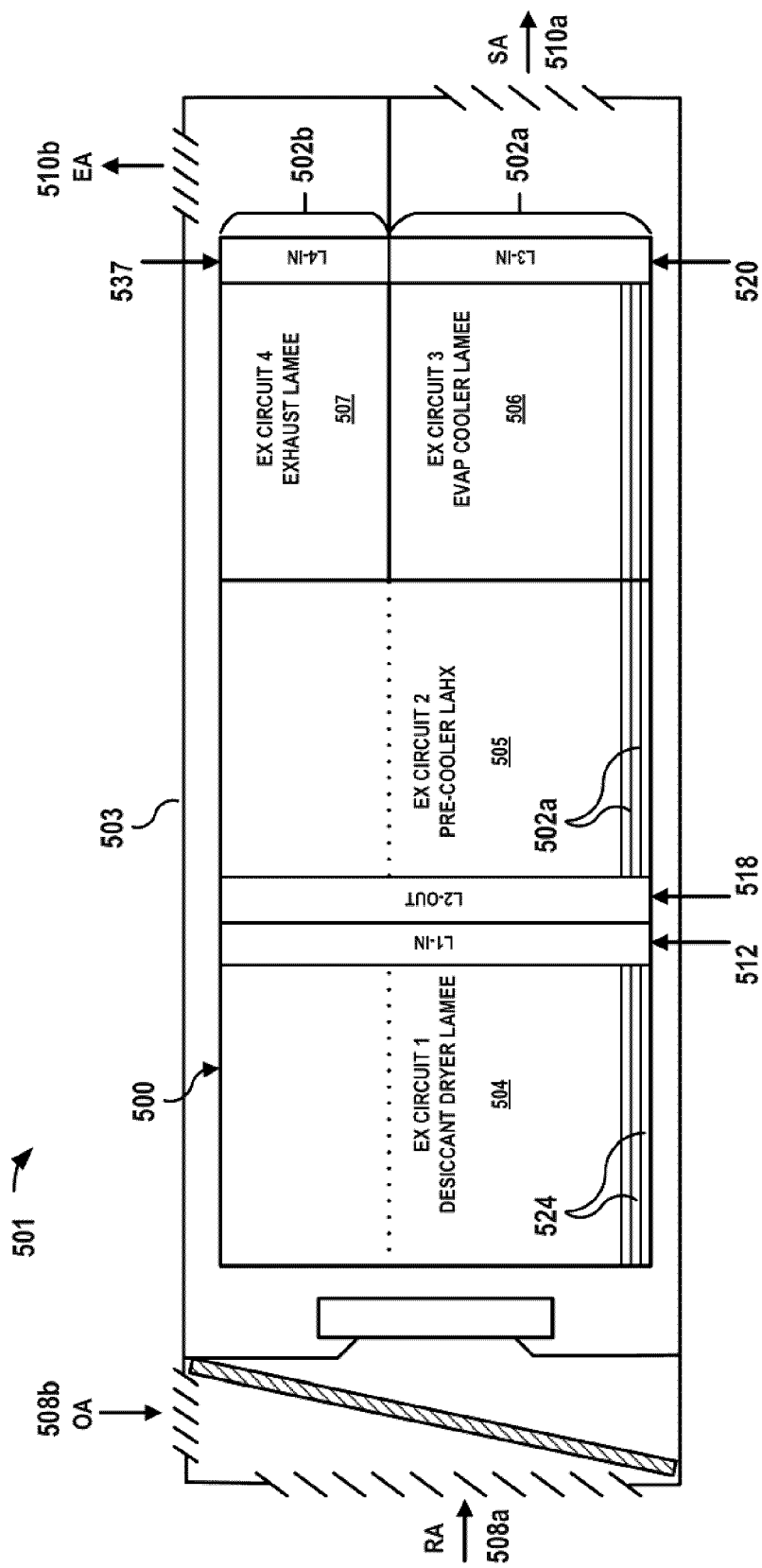
FIGS. 5A-5C schematically depict an example conditioning system including an example LAEE in accordance with this disclosure.
Figure 5B:
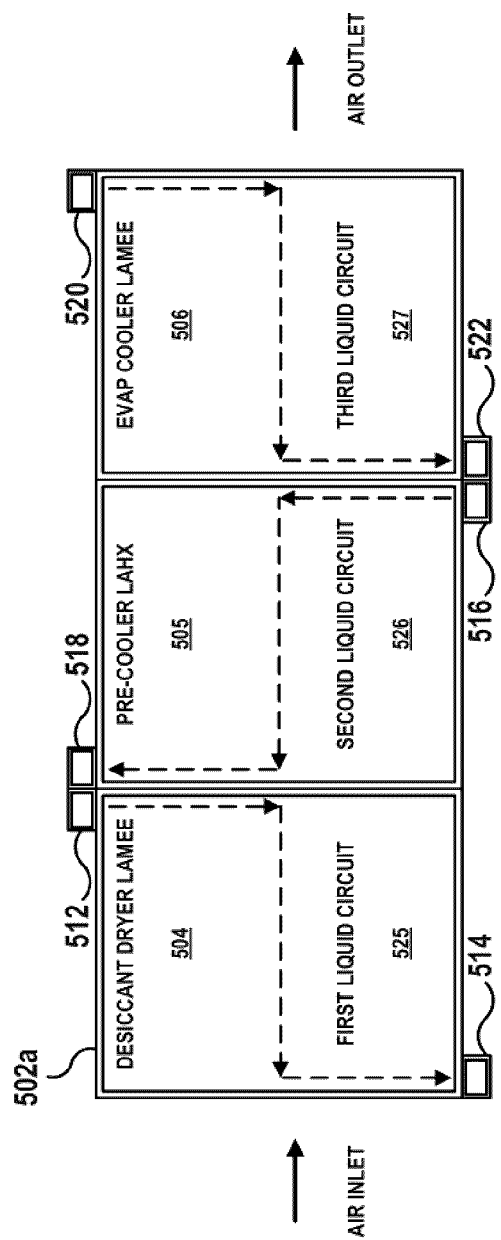
Figure 5C:
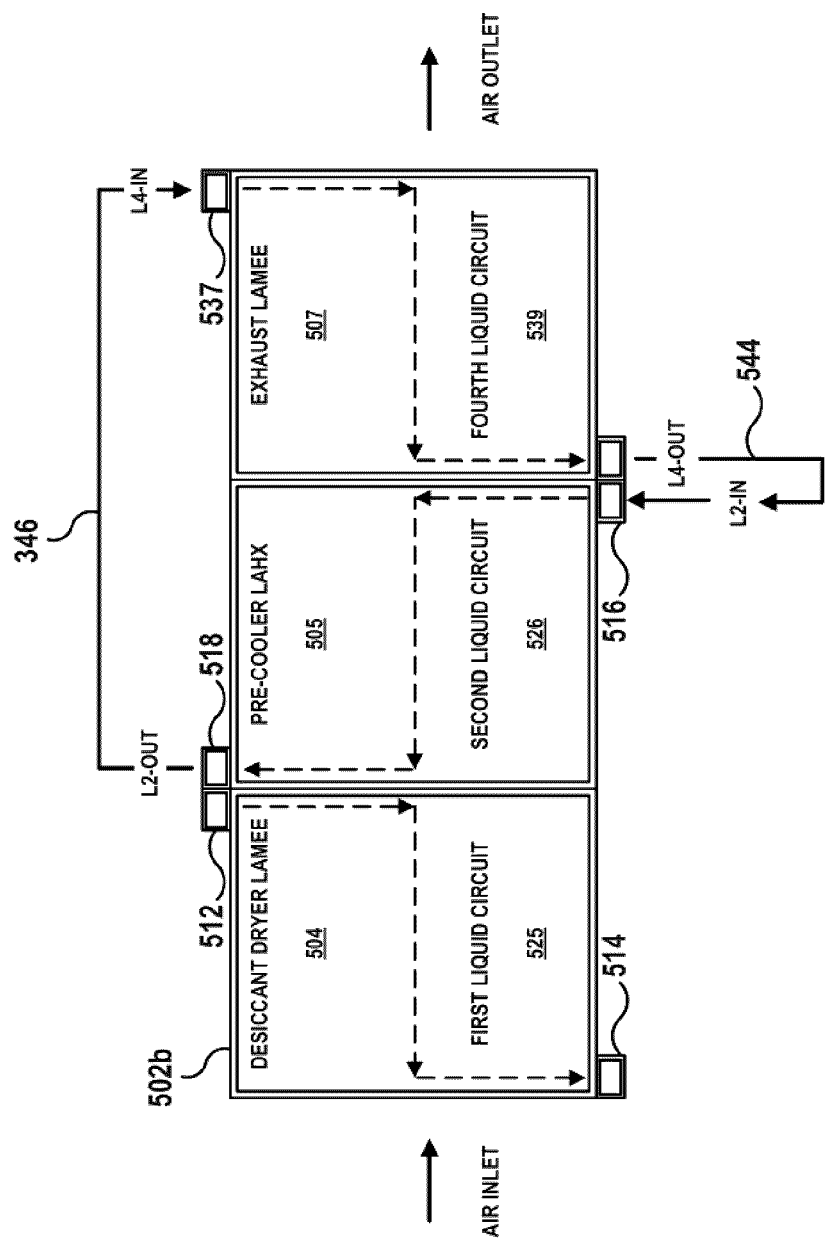

FIGS. 5A-5C schematically depict example conditioning system 501 including example liquid-to-air energy exchanger (LAEE) 500 in accordance with this disclosure. FIG. 5A is a plan (e.g., top) view of system 501 including LAEE 500 and FIGS. 5B and 5C are elevation side (e.g., right and left sides, respectively) views of single liquid panels 502a and 502b of LAEE 500. In contrast to the examples of LAEE 100, 200, 300, and 400, LAEE 500 includes four EX circuits, three of which are in series in a direction of air flow and one of which is in parallel. LAEE 500 defining EX circuits in series and parallel is composed of a first plurality of single liquid panels 502a and a second plurality of single liquid panels 502b. Each single liquid panel (502a, 502b) includes three liquid circuits corresponding to the EX circuits of LAEE 500.

Conditioning system 501 is configured for an air-cooling application, including residential applications as well as commercial or industrial applications, including, but not limited to, data centers. Conditioning system 501 can be designed to deliver supply air at low temperatures and low to moderate humidity to an enclosed space. Conditioning system 501 includes LAEE 500 arranged in cabinet 503, into which RA from the enclosed space enters at RA inlet 508a and into which OA enters from OA inlet 508b. Conditioning system 501 can also include filter 570 and fan 572, which can draw air into inlets 508a, 508b, through filter 570 an into air channels 524 of LAEE 500. System 501 can be designed to receive hot return air (RA) from an enclosed space, as well as outdoor air (OA). The return air and outdoor air can mix together inside cabinet 503 near air inlets 508a, 508b to form a mixed air stream. In an example, the amount of outdoor air can be less than half of the amount of return air. In other examples, conditioning system 501 can be designed to essentially only receive return air or essentially only receive outdoor air.

The addition of outdoor air into system 501 can provide replenishment or make up air to the enclosed space and can eliminate or reduce the need for separate ventilation and make-up air units. The outdoor air (as well as the inclusion of exhaust EX circuit 507) can be used to reject heat from the system 501 to the outside. For example, an exhaust air stream flowing through exhaust EX circuit 507 corresponding to fourth liquid circuit 527 of the second plurality of single liquid panels 502b can provide additional cooling to other components included in conditioning system 501.

Referring to FIG. 5B, each of first plurality of single liquid panels 502a includes first liquid circuit 525 corresponding to desiccant dryer EX circuit 504, second liquid circuit 526 corresponding to pre-cooler EX circuit 505, and third liquid circuit 527 corresponding to evaporative cooler EX circuit 506. Additionally, referring to FIG. 5C, each of second plurality of single liquid panels 502b includes first liquid circuit 525 corresponding to desiccant dryer EX circuit 504, second liquid circuit 526 corresponding to pre-cooler EX circuit 505, and fourth liquid circuit 539 corresponding to exhaust EX circuit 507. As depicted in FIGS. 5A-5C, desiccant dryer EX circuit 504, pre-cooler EX circuit 505, and evaporative cooler EX circuit 506 are arranged in series in a direction of air flow through LAEE 500 and exhaust EX circuit 507 is arranged in parallel with evaporative cooler EX circuit 506.

LAEE 500 is the same as LAEE 300 in the sense that the first plurality of single liquid panels 502a includes desiccant dryer EX circuit 504, pre-cooler EX circuit 505, and evaporative cooler EX circuit 506, which can be physically configured, arranged, and operationally the same or substantially similar to EX circuit 304, pre-cooler EX circuit 305, and evaporative cooler EX circuit 306 of LAEE 300. Thus, the functions and features of LAEE 300 discussed above can be the same or substantially similar as the functions and features of the section of LAEE 500 including the first plurality of single liquid panels 502a (and air channels 524 interposed between pairs of single liquid panels 502a). However, LAEE 500 also includes the second plurality of single liquid panels 502b, which include desiccant dryer EX circuit 504, pre-cooler EX circuit 505, and exhaust EX circuit 507. Exhaust EX circuit 507 is arranged in parallel with evaporative cooler EX circuit 506.

Referring to FIGS. 5A-5C, LAEE 500 includes L1 inlet 512, L1 outlet 514, L2 inlet 516, L2 outlet 518, L3 inlet 520, L3 outlet 522, L4 inlet 437, and L4 outlet 438. LAEE 500 include a plurality of liquid and air channels stacked side-by-side with an air channel between pairs of liquid channels (defined by single liquid panels 502a, 502b). Each single liquid panel of the first plurality single liquid panels 502a and the second plurality single liquid panels 502b includes a plurality of liquid circuits, through each of which a liquid is configured to flow. Each of the liquid circuits of each single liquid panel (502a, 502b), e.g., each of first liquid circuit 525, second liquid circuit 526, third liquid circuit 527, and fourth liquid circuit 539 has a plurality of closed liquid channels through each of which a liquid is configured to flow without mixing with the liquid flowing through other of the plurality of closed liquid channels.

Air channel 324 is adjacent the two single liquid panels of the first plurality single liquid panels 502a and the second plurality single liquid panels 502b. Air channel 324 extends adjacent all of the plurality of liquid circuits of single liquid panels 502a and 502b. Air flows through air channel 324 from air inlets 508a, 508b to air outlets 510a, 510b of LAEE 500. As described in more detail below, the air exiting exhaust EX circuit 507 is exhausted via air outlet 510b and separated from air exiting evaporative cooler EX circuit 506. Air exiting evaporative cooler EX circuit 506 is exhausted via air outlet 510a and separated from air exiting exhaust EX circuit 507.

A number of membranes are connected to each of single liquid panels 502a and 502b. The membranes employed in LAEE 500 can be similar to membranes employed in LAEEs 100, 200, 300, and 400, but are not shown in FIGS. 5A-5C. For example, the first plurality single liquid panels 502a can include a pair of first membranes, which are connected to either side of and enclose first liquid circuit 525. The first plurality single liquid panels 502a can include a pair of second membranes, which are connected to either side of and encloses second liquid circuit 526, and a pair of third membranes, which are connected to either side of and encloses third liquid circuit 527. The second plurality single liquid panels 502b can include the pair of first membranes connected to either side of and enclosing first liquid circuit 525. The second plurality single liquid panels 502b can also include the pair of second membranes connected to either side of and enclosing second liquid circuit 526. And, the second plurality single liquid panels 502b include a pair of fourth membranes, which are connected to either side of and enclose fourth liquid circuit 539.

The first membranes are disposed between first liquid circuit 525 and a pair of air channels 524 and form a barrier between a first liquid (L1) flowing through first liquid circuit 525 and air flowing through the air channels. Similarly, the second membranes are disposed between second liquid circuit 526 and a pair of air channels 524 and form a barrier between a second liquid (L2) flowing through second liquid circuit 526 and air flowing through the air channels. The third membranes are disposed between third liquid circuit 527 and a pair of air channels 524 and form a barrier between a third liquid (L3) flowing through third liquid circuit 527 and air flowing through the air channels. And, the fourth membranes are disposed between fourth liquid circuit 539 and a pair of air channels 524 and form a barrier between a fourth liquid (L4) flowing through fourth liquid circuit 539 and air flowing through the air channels.

Each of desiccant dryer EX circuit 504, pre-cooler EX circuit 505, evaporative cooler EX circuit 506, and exhaust EX circuit 507 corresponds to each of first liquid circuit 525, second liquid circuit 526, third liquid circuit 527, and fourth liquid circuit 539 and each EX circuit is configured to exchange at least one of latent and sensible energy between a liquid flowing through the respective liquid circuit and the air flowing through air channels 524.

In the example of FIGS. 5A-5C, first liquid circuit 525 circulates a liquid desiccant from L1 inlet 512 to L1 outlet 514 and first EX circuit 504 includes first pair of semi-permeable membranes to configure the first EX circuit as a desiccant dryer liquid-to-air semi-permeable membrane energy exchanger (LAMEE). In this example, the liquid desiccant flowing through first liquid circuit 525 absorbs water from the air flowing through first EX circuit 504 such that a moisture content of the air exiting the first EX circuit is lower than a moisture content of the air entering the first EX circuit.

Second liquid circuit 526, as an example, circulates water from L2 inlet 516 to L2 outlet 518 and second EX circuit 505 includes second pair of impermeable membranes to configure the second EX circuit as a liquid-to-air heat exchanger (LAHX). The water flowing through pre-cooler EX circuit 505 sensibly cools the air flowing through EX circuit 505 such that the temperature of the air entering pre-cooler EX circuit 505 is higher than the temperature of the air exiting EX circuit 505.

Third liquid circuit 527, as an example, circulates water from L3 inlet 520 to L3 outlet 522 and third EX circuit 506 includes third pair of semi-permeable membranes to configure the third EX circuit as an evaporative cooler LAMEE. Evaporative cooler EX circuit 506 can evaporatively cool at least one of the water and the air flowing through EX circuit 506 such that a temperature of the at least one of the water and the air exiting evaporative cooler EX circuit 506 is lower than a temperature of the at least one of the water and the air entering evaporative cooler EX circuit 506.

Fourth liquid circuit 539, as an example, circulates water from L4 inlet 537 to L4 outlet 538 and fourth EX circuit 507 includes fourth pair of semi-permeable membranes to configure the fourth EX circuit as an exhaust evaporative cooler LAMEE. Exhaust EX circuit 507 can evaporatively cool the water flowing through EX circuit 507 such that a temperature of the water exiting exhaust EX circuit 507 is lower than a temperature of the water entering exhaust EX circuit 507.

As noted above, conditioning system 501 is configured for an air-cooling application in which incoming process air, e.g. a equal or non-equal mixture of RA and OA, is conditioned through desiccant dryer EX circuit 504, pre-cooler EX circuit 505, evaporative cooler EX circuit 506, and exhaust EX circuit 507. The portion of the conditioned process air flowing through evaporative cooler EX circuit 506 is returned as SA to the enclosed space via air outlet 510a. The portion of the conditioned process air flowing through exhaust EX circuit 507 is exhausted as EA via air outlet 510b.

The air and liquid conditioning that occurs in the first plurality single liquid panels 502a including first liquid circuit 525, second liquid circuit 526, and third liquid circuit 527 corresponding to desiccant dryer EX circuit 504, pre-cooler EX circuit 505, and evaporative cooler EX circuit 506 can be the same as or substantially similar to of desiccant dryer EX circuit 304, pre-cooler EX circuit 305, and evaporative cooler EX circuit 306 of LAEE 300. Additionally, the liquid transport circuits and implementation of a regenerator to regenerate liquid desiccant flowing through desiccant dryer EX circuit 504 can be the same as or substantially similar to that described with reference to LAEE 300.

For example, in the air-cooling application of LAEE 500 in conditioning system 501, the destination of water exiting evaporative cooler EX circuit 506 via L3 outlet 520 can be L3 inlet 520 or a water reservoir that is connected to L3 inlet 520. In such cases, the water exiting evaporative cooler EX circuit 506 at L3 outlet 522 can be recirculated back to evaporative cooler EX circuit 506 after the water has been used to cool (and otherwise condition) the air flowing through EX circuit 506 and supplied to the enclosed space via air outlet 510. The water exiting evaporative cooler EX circuit 506 at L3 outlet 522 can be mixed with water from a water supply, e.g., a cooled water supply that when mixed with water exiting EX circuit 506 effectively cools the water exiting EX circuit 506 to an acceptable inlet water temperature. Additionally, the water exiting evaporative cooler EX circuit 506 at L3 outlet 522 can be mixed with water recovered from diluted liquid desiccant regenerated in a regenerator fluidically connected to L1 outlet 514 of desiccant dryer EX circuit 504. The water extracted from the liquid desiccant can be transported from the regenerator (or a liquid reservoir connected thereto) to L3 inlet 520 or a reservoir connected thereto via a liquid transport circuit in accordance with such circuits described with reference to the example of LAEE 300.

In addition to the liquid transport circuits described above with reference to LAEE 300, LAEE 500 can include first liquid transport circuit 544, which is configured to transport water exiting exhaust EX circuit 507/fourth liquid circuit 539 via L4 outlet 538 to L2 inlet 516 of pre-cooler EX circuit 505/second liquid circuit 526. Additionally, LAEE 500 can include second liquid transport circuit 546, which is configured to transport water exiting pre-cooler EX circuit 505/second liquid circuit 526 via L2 outlet 518 to L4 inlet 537 of exhaust EX circuit 507/fourth liquid circuit 539. In this manner, the exhaust LAM EE of exhaust EX circuit 507 can be configured as an evaporative cooler LAMEE, which uses EA (a portion of the total air flowing through LAEE 500) to evaporatively cool the water exiting pre-cooler EX circuit 505 and return the cooled water to EX circuit 505.

In an example, the amount of EA exhausted via air outlet 510b can be about equal to the amount of OA input into cabinet 503 via OA inlet 508b. In another example, the amount of EA exhausted via air outlet 510b can be more or less than the amount of OA input via OA inlet 508b.

Examples of liquid desiccants usable in LAEE 500 and other LAEEs and systems in accordance with this disclosure include, but are not limited to, hygroscopic polyol based solutions, sulfuric acid and phosphoric acid. Glycerol is an example of a hygroscopic polyol usable herein. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, the first, third, and fourth membranes (associated with first liquid circuit 525, third liquid circuit 527, and fourth liquid circuit 539, respectively) can be semi-permeable and materials in a gas/vapor phase can pass through the membrane and materials in a liquid or solid phase cannot pass through the membrane. Semi-permeable membranes in examples according to this disclosure can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquid, solids, and vapor/gas of other constituents of the liquid.

Figure 6A:
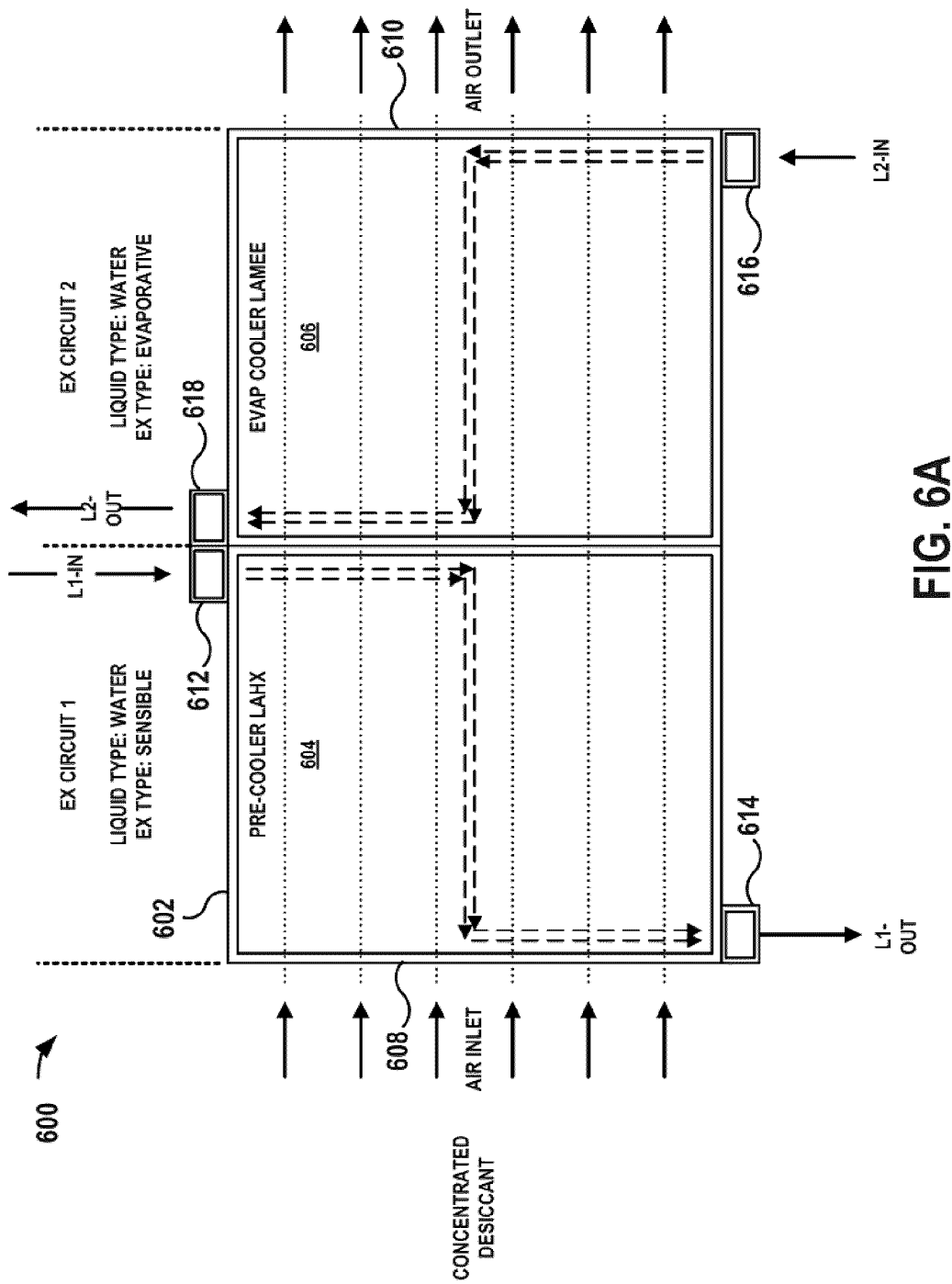
FIGS. 6A and 6B schematically depict another example LAEE in accordance with this disclosure.
Figure 6B:
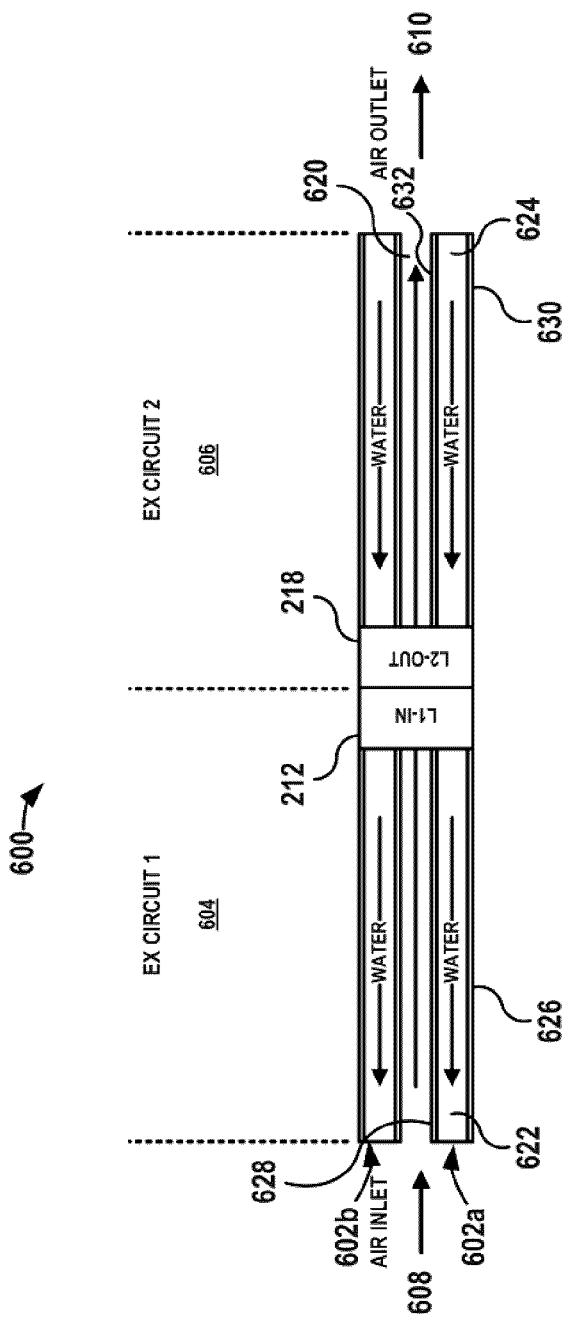

FIGS. 6A and 6B schematically depict another example liquid-to-air energy exchanger (LAEE) 600 in accordance with this disclosure. Referring to FIG. 6A, LAEE 600 includes liquid panel(s) 602, pre-cooler LAHX 604, evaporative cooler EX circuit 606, air inlet 608, air outlet 610, first liquid (L1) inlet 612, L1 outlet 614, second liquid (L2) inlet 616, and L2 outlet 618. LAEE 600 can include a plurality of liquid and air channels stacked side-by-side with an air channel between pairs of liquid channels. Referring to FIG. 6B, which is a plan view schematically depicting air channel 620 between two single liquid panels 602a and 602b. Each liquid panel 602a and 602b has first liquid circuit 622 and second liquid circuit 624 through each of which a liquid is configured to flow. As with the example of FIGS. 1A-1C, each of first liquid circuit 622 and second liquid circuit 624 has a plurality of closed liquid channels through each of which a liquid is configured to flow without mixing with the liquid flowing through other of the plurality of closed liquid channels. Each of first liquid circuit 622 and second liquid circuit 624 corresponds to each of pre-cooler LAHX 604 and evaporative cooler EX circuit 606.

Air channel 620 is adjacent the two single liquid panels 602a and 602b. Air channel 620 extends adjacent all of the plurality of liquid circuits of liquid panels 602a and 602b, including first liquid circuit 622 and second liquid circuit 624. Air flows through air channel 620 from air inlet 610 to air outlet 612 of LAEE 600.

A number of membranes are connected to each of single liquid panels 602a and 602b. Referring to FIG. 6B, liquid panel 602a includes a pair of first membranes 626 and 628, which are connected to either side of and encloses first liquid circuit 622. Liquid panel 602a also includes a pair of second membranes 630 and 632, which are connected to either side of and encloses second liquid circuit 624.

First membranes 626 and 628 are disposed between first liquid circuit 626 and a pair of air channels (only one of the pair, air channel 620 shown in FIG. 6B) and form a barrier between a first liquid (L1) flowing through first liquid circuit 626 and air flowing through the air channels, e.g. air channel 620. Similarly, second membranes 630 and 632 are disposed between second liquid circuit 628 and a pair of air channels (only one of the pair, air channel 620 shown in FIG. 6B) and form a barrier between a second liquid (L2) flowing through second liquid circuit 628 and air flowing through the air channels, e.g. air channel 620.

Each of pre-cooler LAHX 604 and evaporative cooler EX circuit 606 corresponds to each of first liquid circuit 622 and second liquid circuit 624 and each EX circuit is configured to exchange at least one of latent and sensible energy between a liquid flowing through the respective liquid circuit and the air flowing through air channel 620. In the example of FIGS. 6A and 6B, first liquid circuit 624 circulates water from L1 inlet 612 to L1 outlet 614 and first EX circuit 604 includes impermeable membranes 626, 628 to configure the first EX circuit as liquid-to-air heat exchanger (LAHX). In this example, the water flowing through pre-cooler EX circuit 604 sensibly cools the air flowing through EX circuit 604 such that the temperature of the air entering pre-cooler EX circuit 604 is higher than the temperature of the air exiting EX circuit 604.

Second liquid circuit 624, as an example, circulates water from L2 inlet 616 to L2 outlet 618 and second EX circuit 606 includes semi-permeable membranes 630, 632 to configure the second EX circuit as an evaporative cooler LAMEE. In this example, membranes 630 and 632 can be semi-permeable membranes and evaporative cooler EX circuit 606 can evaporatively cool at least one of the water and the air flowing through EX circuit 606 such that a temperature of the at least one of the water and the air exiting evaporative cooler EX circuit 606 is lower than a temperature of the at least one of the water and the air entering evaporative cooler EX circuit 606.

LAEE 600 can be used in air-cooling and liquid-cooling applications. In an air-cooling application, LAEE 600 defines a process air plenum through which process air flows from inlet 608 to outlet 610. In an air-cooling application, at least a portion of the air entering LAEE 600 via inlet 608 can be return air from an enclosed space. In some examples, outdoor air may be mixed with return air or all of the air entering LAEE 600 can be outdoor air. In an air-cooling application, evaporative cooler EX circuit 606 can evaporatively cool the air flowing through EX circuit 606 such that a temperature of the air exiting evaporative cooler EX circuit 606 is lower than a temperature of the air entering evaporative cooler EX circuit 606.

In a liquid-cooling application, LAEE 600 can include a liquid transport circuit connected to L2 outlet 618 of evaporative cooler EX circuit 606 and configured to transport the water to a heat load in an enclosed space. In liquid-cooling applications, evaporative cooler EX circuit 606 is configured to evaporatively cool the water, a temperature of the water exiting the second EX circuit via the liquid outlet being lower than a temperature of the water entering the second EX circuit via a liquid inlet.

In such liquid cooling examples, the evaporatively cooled water exiting evaporative cooler EX circuit 606 can be transported to a heat load. The heat load can be heated air in an enclosed space or heat generating components within the enclosed space, as examples. In some examples, therefore, liquid water cooled in evaporative cooler EX circuit 606 can be delivered to a separate liquid or air-cooling system that modulates the temperature of the heat load, for example, by liquid cooling heat generating components or cooling the heated air within the enclosed space. The water employed in such separate liquid or air-cooling systems associated with the enclosed space can be returned to L2 inlet 616 via a liquid transport circuit.

In one liquid cooling application of LAEE 600, water cooled by and exiting evaporative cooler EX circuit 606 through L2 outlet 618 is transported to a heat load in an enclosed space. The heat load is heated air within the enclosed space and cooled water from evaporative cooler EX circuit 606 is delivered to an air-cooling system associated with the enclosed space. In such an example, the air flowing through LAEE 600 can be scavenger air, which can include outdoor air. The air-cooling system associated with the enclosed space and receiving the cooled water from LAEE 600 can include a process plenum configured to direct process air through a process air inlet and return conditioned process air to the enclosed space through a process air outlet, and a liquid-to-air heat exchanger (LAHX) arranged inside the process plenum. The LAHX includes a liquid inlet connected to and configured to receive the water from L2 outlet 618 of EX circuit 606. And, the LAHX of the air-cooling system associated with the enclosed space is configured to directly and sensibly cool the process air using the water flowing through the LAHX and received from evaporative cooler EX circuit 606. In operation, the temperature of the conditioned process air exiting the LAHX is lower than the temperature of the air entering the LAHX and thus the air-cooling system including such LAHX can be configured to cool supply/process air to the enclosed space to a set point temperature.

Examples of liquid desiccants usable in LAEE 600 and other LAEEs and systems in accordance with this disclosure include, but are not limited to, hygroscopic polyol based solutions, sulfuric acid and phosphoric acid. Glycerol is an example of a hygroscopic polyol usable herein. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, second membranes 630, 632 can be semi-permeable and materials in a gas/vapor phase can pass through the membrane and materials in a liquid or solid phase cannot pass through the membrane. Semi-permeable membranes in examples according to this disclosure can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquid, solids, and vapor/gas of other constituents of the liquid.

Figure 7A:
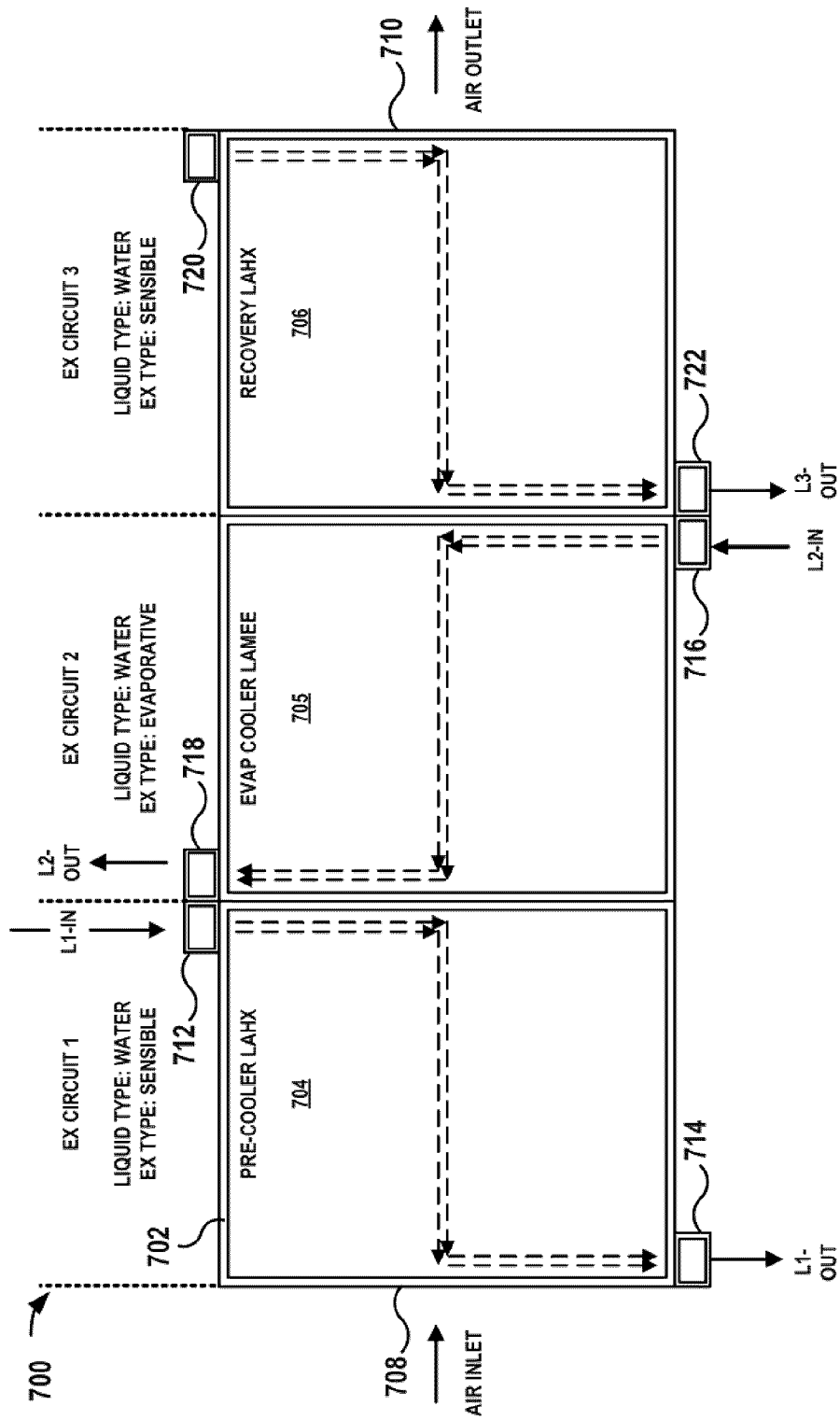
FIGS. 7A and 7B schematically depict another example LAEE in accordance with this disclosure.
Figure 7B:
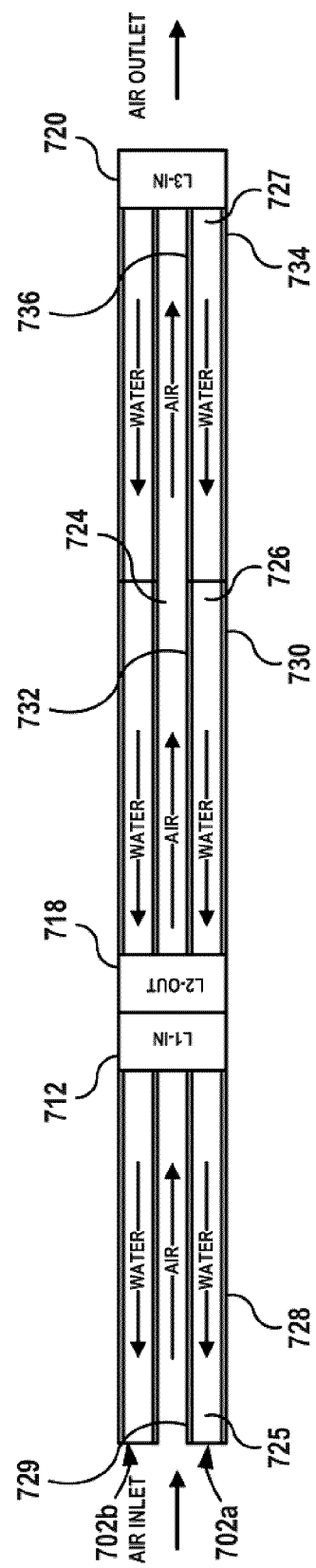

FIGS. 7A and 7B schematically depict another example liquid-to-air energy exchanger (LAEE) 700 in accordance with this disclosure. Referring to FIG. 7A, LAEE 700 includes liquid panel(s) 702, pre-cooler energy exchange (EX) circuit 704, evaporative cooler EX circuit 705, recovery EX circuit 706, air inlet 708, air outlet 710, first liquid (L1) inlet 712, L1 outlet 714, second liquid (L2) inlet 716, L2 outlet 718, L3 inlet 720, and L3 outlet 722. LAEE 700 can include a plurality of liquid and air channels stacked side-by-side with an air channel between pairs of liquid channels. Referring to FIG. 7B, which is a plan view schematically depicting air channel 720 between two single liquid panels 702*a* and 702*b*. Each liquid panel 702*a* and 702*b* has first liquid circuit 725, second liquid circuit 726, and third liquid circuit 727 through each of which a liquid is configured to flow. As with the example of FIGS. 1A-1C, each of first liquid circuit 725, second liquid circuit 726, and third liquid circuit 727 has a plurality of closed liquid channels through each of which a liquid is configured to flow without mixing with the liquid flowing through other of the plurality of closed liquid channels. Each of first liquid circuit 725, second liquid circuit 726, and third liquid circuit 727 corresponds to each of pre-cooler EX circuit 704, evaporative cooler EX circuit 705, and recovery EX circuit 706.

Air channel 720 is adjacent the two single liquid panels 702*a* and 702*b*. Air channel 720 extends adjacent all of the plurality of liquid circuits of liquid panels 702*a* and 702*b*, including first liquid circuit 725, second liquid circuit 726, and third liquid circuit 727. Air flows through air channel 720 from air inlet 710 to air outlet 712 of LAEE 700.

A number of membranes are connected to each of single liquid panels 702*a* and 702*b*. Referring to FIG. 7B, liquid panel 702*a* includes a pair of first membranes 726 and 728, which are connected to either side of and encloses first liquid circuit 722. Liquid panel 702*a* also includes a pair of second membranes 730 and 732, which are connected to either side of and encloses second liquid circuit 724. Additionally, liquid panel 702*a* includes a pair of third membranes 734 and 736, which are connected to either side of and encloses third liquid circuit 727.

First membranes 728 and 729 are disposed between first liquid circuit 725 and a pair of air channels (only one of the pair, air channel 724 shown in FIG. 7B) and form a barrier between a first liquid (L1) flowing through first liquid circuit 725 and air flowing through the air channels, e.g. air channel 724. Similarly, second membranes 730 and 732 are disposed between second liquid circuit 726 and a pair of air channels (only one of the pair, air channel 724 shown in FIG. 7B) and form a barrier between a second liquid (L2) flowing through second liquid circuit 726 and air flowing through the air channels, e.g. air channel 724. And, third membranes 734 and 736 are disposed between third liquid circuit 727 and a pair of air channels (only one of the pair, air channel 724 shown in FIG. 7B) and form a barrier between a third liquid (L3) flowing through third liquid circuit 727 and air flowing through the air channels, e.g. air channel 724.

Each of pre-cooler EX circuit 704, evaporative cooler EX circuit 705, recovery EX circuit 706 corresponds to each of first liquid circuit 725, second liquid circuit 726, and third liquid circuit 727 and each EX circuit is configured to exchange at least one of latent and sensible energy between a liquid flowing through the respective liquid circuit and the air flowing through air channel 720. In the example of FIGS. 7A and 7B, first liquid circuit 724 circulates water from L1 inlet 712 to L1 outlet 714 and first EX circuit 704 includes impermeable membranes 726, 728 to configure the first EX circuit as liquid-to-air heat exchanger (LAHX). In this example, the water flowing through pre-cooler EX circuit 704 sensibly cools the air flowing through EX circuit 704 such that the temperature of the air entering pre-cooler EX circuit 704 is higher than the temperature of the air exiting EX circuit 704.

Second liquid circuit 724, as an example, circulates water from L2 inlet 716 to L2 outlet 718 and second EX circuit 705 includes semi-permeable membranes 730, 732 to configure the second EX circuit as an evaporative cooler LAMEE. In this example, membranes 730 and 732 can be semi-permeable membranes and evaporative cooler EX circuit 705 can evaporatively cool at least one of the water and the air flowing through EX circuit 705 such that a temperature of the at least one of the water and the air exiting evaporative cooler EX circuit 705 is lower than a temperature of the at least one of the water and the air entering evaporative cooler EX circuit 705.

Third liquid circuit 727, as an example, circulates water from L3 inlet 720 to L3 outlet 722 and recovery EX circuit 706 includes impermeable membranes 734, 736 to configure the fourth EX circuit as a liquid-to-air heat exchanger (LAHX). The air flowing through recovery EX circuit 706 sensibly cools the water flowing through EX circuit 706 such that the temperature of the water entering recovery EX circuit 706 is higher than the temperature of the water exiting EX circuit 706.

LAEE 700 can be used in air-cooling and liquid-cooling applications. In a liquid-cooling application, LAEE 700 can include a liquid transport circuit connected to L2 outlet 718 of evaporative cooler EX circuit 705 and configured to transport the water to a heat load in an enclosed space. In liquid-cooling applications, evaporative cooler EX circuit 705 is configured to evaporatively cool the water, a temperature of the water exiting the second EX circuit via the liquid outlet being lower than a temperature of the water entering the second EX circuit via a liquid inlet.

In such liquid cooling examples, the evaporatively cooled water exiting evaporative cooler EX circuit 705 can be transported to a heat load. The heat load can be heated air in an enclosed space or heat generating components within the enclosed space, as examples. In some examples, therefore, liquid water cooled in evaporative cooler EX circuit 705 can be delivered to a separate liquid or air-cooling system that modulates the temperature of the heat load, for example, by liquid cooling heat generating components or cooling the heated air within the enclosed space. The water employed in such separate liquid or air-cooling systems associated with the enclosed space can be returned to L2 inlet 716 via a liquid transport circuit.

In one liquid cooling application of LAEE 700, water cooled by and exiting evaporative cooler EX circuit 705 through L2 outlet 718 is transported to a heat load in an enclosed space. The heat load is heated air within the enclosed space and cooled water from evaporative cooler EX circuit 705 is delivered to an air-cooling system associated with the enclosed space. In such an example, the air flowing through LAEE 700 can be scavenger air, which can include outdoor air. The air-cooling system associated with the enclosed space and receiving the cooled water from LAEE 700 can include a process plenum configured to direct process air through a process air inlet and return conditioned process air to the enclosed space through a process air outlet, and a liquid-to-air heat exchanger (LAHX) arranged inside the process plenum. The LAHX includes a liquid inlet connected to and configured to receive the water from L2 outlet 718 of EX circuit 705. And, the LAHX of the air-cooling system associated with the enclosed space is configured to directly and sensibly cool the process air using the water flowing through the LAHX and received from evaporative cooler EX circuit 705. In operation, the temperature of the conditioned process air exiting the LAHX is lower than the temperature of the air entering the LAHX and thus the air-cooling system including such LAHX can be configured to cool supply/process air to the enclosed space to a set point temperature.

Examples of liquid desiccants usable in LAEE 700 and other LAEEs and systems in accordance with this disclosure include, but are not limited to, hygroscopic polyol based solutions, sulfuric acid and phosphoric acid. Glycerol is an example of a hygroscopic polyol usable herein. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, second membranes 630, 632 can be semi-permeable and materials in a gas/vapor phase can pass through the membrane and materials in a liquid or solid phase cannot pass through the membrane. Semi-permeable membranes in examples according to this disclosure can include micro-porous, non-porous ion exchange, and non-porous pervaporation membranes. Additionally, semi-permeable membranes can include what is sometimes referred to as selective membranes, which are selectively permeable to vapor/gases of some constituents of the material flowing through the liquid circuit contained by the membrane and impermeable to liquid, solids, and vapor/gas of other constituents of the liquid.

All of the foregoing example LAEEs (100, 200, 300, 400, 500, 600, and 700) are composed of a plurality of single liquid panels, each of which includes a plurality of liquid circuits arranged in series in a direction of air flow through the LAEE. In the foregoing examples, each of the liquid circuits of a single liquid panel is depicted as fluidically isolated from the other liquid circuits of the single liquid panel. However, there are instances in which two adjacent EX circuits and corresponding adjacent liquid circuits circulate the same type of liquid. In such cases, the adjacent liquid circuits may intermix with one another and the single type of liquid may flow through both adjacent liquid circuits.

Figure 8A:
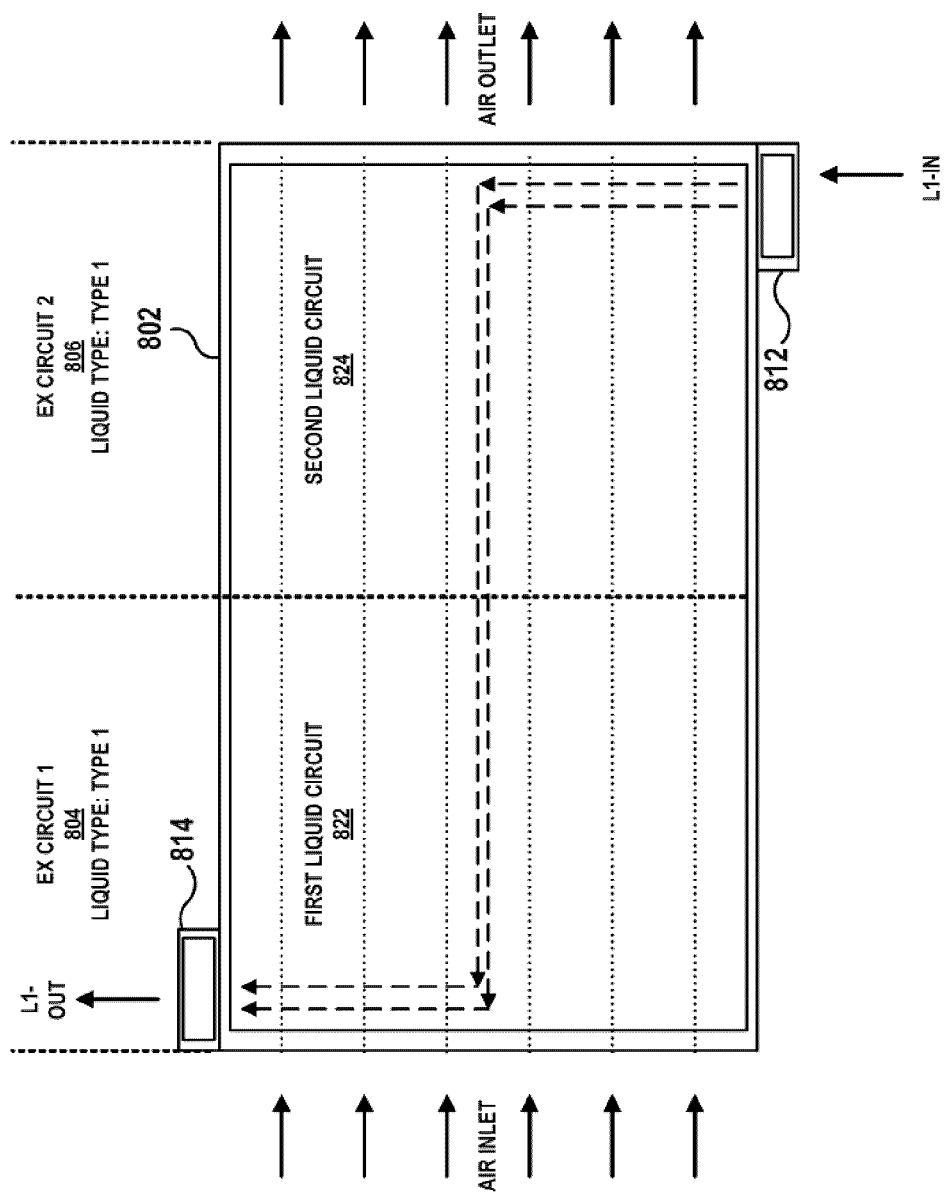
FIGS. 8A and 8B depict an example single liquid panel including a plurality of liquid circuits corresponding to a plurality of energy exchange circuits of an LAEE in accordance with this disclosure.
Figure 8B:
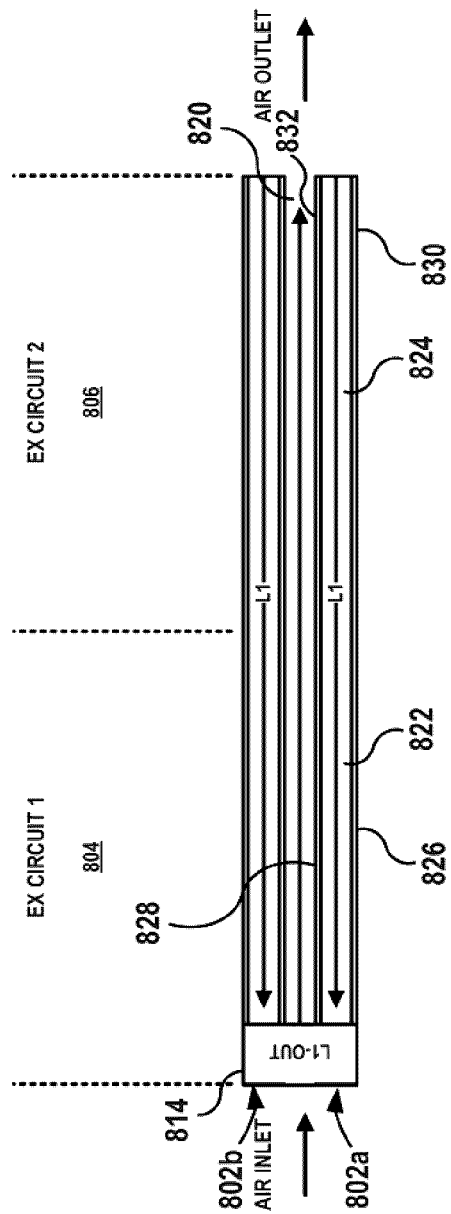

FIG. 8A depicts example single liquid panel 802 including a plurality of liquid circuits corresponding to a plurality of EX circuits 804 and 806 of an LAEE in which panel 802 is included. In FIG. 8A, example single liquid panel 802 includes or defines first energy exchange (EX) circuit 804, second EX circuit 806, first liquid (L1) inlet 112, and L1 outlet 114. An example LAEE incorporating single liquid panel 802 can include a plurality of liquid and air channels stacked side-by-side with an air channel between pairs of liquid channels. Referring to FIG. 8B, which is a plan view schematically depicting air channel 220 between two single liquid panels 802a and 802b. Each liquid panel 802a and 802b has first liquid circuit 822 and second liquid circuit 824 through each of which a liquid is configured to flow. In the example of FIGS. 8A and 8B, a single type and stream of liquid, L1 is configured to flow continuously through both first liquid circuit 822 and second liquid circuit 824 of liquid panel 802. Each of first liquid circuit 822 and second liquid circuit 824 has a plurality of closed liquid channels through each of which L1 is configured to flow without mixing with L1 flowing through other of the plurality of closed liquid channels. Each of first liquid circuit 822 and second liquid circuit 824 corresponds to each of first EX circuit 804 and second EX circuit 806.

Air channel 820 is adjacent the two single liquid panels 802a and 802b. Air channel 820 extends adjacent all of the plurality of liquid circuits of liquid panels 802a and 802b, including first liquid circuit 822 and second liquid circuit 824.

Although L1 flows through both first liquid circuit 822 and second liquid circuit 824 from a single L1 inlet 812 to a single L1 outlet 814, first liquid circuit 822 and second liquid circuit 824 may include separate membranes associated with each liquid circuit. For example, liquid panel 802a includes a pair of first membranes 826 and 828, which are connected to either side of and encloses first liquid circuit 822. Liquid panel 802a also includes a pair of second membranes 830 and 832, which are connected to either side of and encloses second liquid circuit 824.

First membranes 826 and 828 are disposed between first liquid circuit 826 and a pair of air channels (only one of the pair, air channel 820 shown in FIG. 8B) and form a barrier between a first liquid (L1) flowing through first liquid circuit 826 and air flowing through the air channels. Similarly, second membranes 830 and 832 are disposed between second liquid circuit 828 and a pair of air channels (only one of the pair, air channel 120 shown in FIG. 1B) and form a barrier between L1 flowing through second liquid circuit 828 and air flowing through the air channels.

Each of first EX circuit 804 and second EX circuit 806 corresponds to each of first liquid circuit 822 and second liquid circuit 824 and each EX circuit is configured to exchange at least one of latent and sensible energy between a liquid flowing through the respective liquid circuit and the air flowing through air channel 820. In example multi-stage/circuit integrated panel LAEEs employing example single liquid panel 802, first EX circuit 804 and second EX circuit 806 can have a variety of thermodynamic functions, as long as both first EX circuit 804 and second EX circuit 806 employ the same liquid, including cooling, evaporative, and desiccant liquids, as examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The present application provides for the following exemplary embodiments or examples, the numbering of which is not to be construed as designating levels of importance:

Example 1 provides a conditioning system comprising: a liquid-to-air energy exchanger (LAEE) having a plurality of energy exchange (EX) circuits, the LAEE comprising: a single liquid panel having a plurality of liquid circuits through each of which a liquid is configured to flow, each of the plurality of liquid circuits having a plurality of closed liquid channels through each of which a liquid is configured to flow without mixing with the liquid flowing through other of the plurality of closed liquid channels, and each of the liquid circuits corresponding to each of the plurality of EX circuits; an air channel adjacent the liquid panel and through which air is configured to flow from an inlet of the LAEE to an outlet of the LAEE, the air channel extending adjacent all of the plurality of liquid circuits; and a plurality of membranes connected to the liquid panel, at least one of the plurality of membranes corresponding to each of the plurality of liquid circuits, and each one of the plurality of membranes disposed between the respective liquid circuit and the air channel, and wherein each of the plurality of EX circuits is configured to exchange at least one of latent and sensible energy between a liquid flowing through the respective liquid circuit and the air.

Example 2 provides the system of Example 1 and optionally wherein: the plurality of liquid circuits comprises: a first liquid circuit through which a first liquid is configured to flow; and a second liquid circuit through which a second liquid is configured to flow, the second liquid circuit arranged downstream of the first liquid circuit in a direction of air flow through the LAEE; the plurality of membranes comprises: a first membrane connected to the liquid panel between the first liquid circuit and the air channel and forming a barrier between the first liquid and the air; and a second membrane connected to the liquid panel between the second liquid circuit and the air channel and forming a barrier between the second liquid and the air; and the plurality of EX circuits comprises: a first EX circuit configured to exchange at least one of latent and sensible energy between the first liquid and the air through the first membrane; and a second EX circuit configured to exchange at least one of latent and sensible energy between the second liquid and the air through the second membrane.

Example 3 provides the system of Example 2 and optionally wherein: the first liquid comprises a liquid desiccant and the second liquid comprises water; each of the first and second membranes comprise a semi-permeable membrane permeable to gases and vapor and impermeable to liquids and solids; the first EX circuit is configured to circulate the liquid desiccant to absorb water from the air flowing through the first EX circuit, a moisture content of the air exiting the first EX circuit being lower than a moisture content of the air entering the first EX circuit; and the second EX circuit is configured to evaporatively cool at least one of the water and the air, a temperature of the at least one of the water and the air exiting the second EX circuit being lower than a temperature of the at least one of the water and the air entering the second EX circuit.

Example 4 provides the system of Example 3 and optionally wherein: the LAEE defines a process plenum and the air is process air; the second EX circuit is configured to evaporatively cool the process air entering the second EX circuit and deliver the conditioned process air to an enclosed space, a temperature of the conditioned process air exiting the second EX circuit being lower than a temperature of the process air entering the second EX circuit.

Example 5 provides the system of Example 4 and optionally wherein the process air entering the LAEE is at least partially return air from the enclosed space.

Example 6 provides the system of Example 4 and optionally a first liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

Example 7 provides the system of Example 6 and optionally a second liquid transport circuit connected to a liquid outlet of the regenerator and configured to transport at least a portion of the water removed from the liquid desiccant to a liquid inlet of the second EX circuit.

Example 8 provides the system of Example 6 and optionally the regenerator is a thermally driven regenerator.

Example 9 provides the system of Example 3 and optionally a liquid transport circuit connected to a liquid outlet of the second EX circuit and configured to transport the water to a heat load in an enclosed space, wherein the second EX circuit is configured to evaporatively cool the water, a temperature of the water exiting the second EX circuit via the liquid outlet being lower than a temperature of the water entering the second EX circuit via a liquid inlet.

Example 10 provides the system of Example 9 and optionally a process plenum configured to direct process air from the enclosed space through a process air inlet and return conditioned process air to the enclosed space through a process air outlet; and a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX, wherein the conditioned process air exiting the process plenum at the process air outlet is returned to the enclosed space.

Example 11 provides the system of Example 10 and optionally the process air entering the LAHX is at least partially return air from the enclosed space.

Example 12 provides the system of Example 10 and optionally the liquid transport circuit is a second liquid transport circuit, and further comprising a first liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

Example 13 provides the system of Example 12 and optionally a third liquid transport circuit connected to a liquid outlet of the regenerator and configured to transport at least a portion of the water removed from the liquid desiccant to a liquid inlet of the second EX circuit.

Example 14 provides the system of Example 12 and optionally the regenerator is a thermally driven regenerator.

Example 15 provides the system of Example 2 and optionally the first membrane comprises an impermeable membrane; the second membrane comprises a semi-permeable membrane permeable to gases and vapor and impermeable to liquids and solids; the first EX circuit is configured to directly and sensibly cool the air using the first liquid, a temperature of the air exiting the first EX circuit being lower than a temperature of the air entering the first EX circuit; and the second EX circuit is configured to evaporatively cool at least one of the second liquid and the air, a temperature of the at least one of the second liquid and the air exiting the second EX circuit being lower than a temperature of the at least one of the second liquid and the air entering the second EX circuit.

Example 16 provides the system of Example 15 and optionally the LAEE defines a process plenum and the air is process air; the second EX circuit is configured to evaporatively cool the process air entering the second EX circuit and deliver the conditioned process air to an enclosed space, a temperature of the conditioned process air exiting the second EX circuit being lower than a temperature of the process air entering the second EX circuit.

Example 17 provides the system of Example 16 and optionally the process air entering the LAEE is at least partially return air from the enclosed space.

Example 18 provides the system of Example 15 and optionally a liquid transport circuit connected to a liquid outlet of the second EX circuit and configured to transport the water to a heat load in an enclosed space, wherein the second EX circuit is configured to evaporatively cool the water, a temperature of the water exiting the second EX circuit via the liquid outlet being lower than a temperature of the water entering the second EX circuit via a liquid inlet.

Example 19 provides the system of Example 18 and optionally the air is scavenger air and further comprising: a process plenum configured to direct process air from the enclosed space through a process air inlet and return conditioned process air to the enclosed space through a process air outlet; and a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX, wherein the conditioned process air exiting the process plenum at the process air outlet is returned to the enclosed space.

Example 20 provides the system of Example 19 and optionally the process air entering the LAHX is at least partially return air from the enclosed space.

Example 21 provides the system of Example 1 and optionally the plurality of liquid circuits comprises: a first liquid circuit through which a first liquid is configured to flow; a second liquid circuit through which a second liquid is configured to flow, the second liquid circuit arranged downstream of the first liquid circuit in a direction of air flow through the LAEE; and a third liquid circuit through which a third liquid is configured to flow, the third liquid circuit arranged downstream of the second liquid circuit in the direction of air flow; the plurality of membranes comprises: a first membrane connected to the liquid panel between the first liquid circuit and the air channel and forming a barrier between the first liquid and the air; a second membrane connected to the liquid panel between the second liquid circuit and the air channel and forming a barrier between the second liquid and the air; and a third membrane connected to the liquid panel between the third liquid circuit and the air channel and forming a barrier between the third liquid and the air; and the plurality of EX circuits comprises: a first EX circuit is configured to exchange at least one of latent and sensible energy between the first liquid and the air through the first membrane; a second EX circuit is configured to exchange at least one of latent and sensible energy between the second liquid and the air through the second membrane; and a third EX circuit is configured to exchange at least one of latent and sensible energy between the third liquid and the air through the third membrane.

Example 22 provides the system of Example 21 and optionally the first liquid comprises a liquid desiccant and each of the second and third liquids comprises water; each of the first and third membranes comprise a semi-permeable membrane permeable to gases and vapor and impermeable to liquids and solids; the second membrane comprises an impermeable membrane; the first EX circuit is configured to circulate the liquid desiccant to absorb water from the air flowing through the first EX circuit, a moisture content of the air exiting the first EX circuit being lower than a moisture content of the air entering the first EX circuit; the second EX circuit is configured to directly and sensibly cool the air using the water flowing through the second EX circuit, a temperature of the air exiting the second EX circuit being lower than a temperature of the air entering the second EX circuit; and the third EX circuit is configured to evaporatively cool at least one of the water flowing through the third EX circuit and the air, a temperature of the at least one of the water and the air exiting the third EX circuit being lower than a temperature of the at least one of the water and the air entering the third EX circuit.

Example 23 provides the system of Example 22 and optionally the LAEE defines a process plenum and the air is process air; the third EX circuit is configured to evaporatively cool the process air entering the third EX circuit and deliver the conditioned process air to an enclosed space, a temperature of the conditioned process air exiting the third EX circuit being lower than a temperature of the process air entering the third EX circuit.

Example 24 provides the system of Example 23 and optionally the process air entering the LAEE is at least partially return air from the enclosed space.

Example 25 provides the system of Example 23 and optionally a first liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

Example 26 provides the system of Example 25 and optionally a second liquid transport circuit connected to a liquid outlet of the regenerator and configured to transport at least a portion of the water removed from the liquid desiccant to a liquid inlet of the third EX circuit.

Example 27 provides the system of Example 25 and optionally the regenerator is a thermally driven regenerator.

Example 28 provides the system of Example 22 and optionally a liquid transport circuit connected to a liquid outlet of the third EX circuit and configured to transport the water to a heat load in an enclosed space, wherein the third EX circuit is configured to evaporatively cool the water, a temperature of the water exiting the third EX circuit via the liquid outlet being lower than a temperature of the water entering the third EX circuit via a liquid inlet.

Example 29 provides the system of Example 28 and optionally a process plenum configured to direct process air from the enclosed space through a process air inlet and return conditioned process air to the enclosed space through a process air outlet; and a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX, wherein the conditioned process air exiting the process plenum at the process air outlet is returned to the enclosed space.

Example 30 provides the system of Example 29 and optionally the process air entering the LAHX is at least partially return air from the enclosed space.

Example 31 provides the system of Example 29 and optionally the liquid transport circuit is a first liquid transport circuit, and further comprising a second liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

Example 32 provides the system of Example 31 and optionally a third liquid transport circuit connected to a liquid outlet of the regenerator and configured to transport at least a portion of the water removed from the liquid desiccant to a liquid inlet of the third EX circuit.

Example 33 provides the system of Example 31 and optionally the regenerator is a thermally driven regenerator.

Example 34 provides the system of Example 21 and optionally each of the first and third membranes comprise an impermeable membrane; the second membrane comprises a semi-permeable membrane permeable to gases and vapor and impermeable to liquids and solids; the first EX circuit is configured to directly and sensibly cool the air using the first liquid, a temperature of the air exiting the first EX circuit being lower than a temperature of the air entering the first EX circuit; the second EX circuit is configured to evaporatively cool at least one of the second liquid and the air, a temperature of the at least one of the second liquid and the air exiting the second EX circuit being lower than a temperature of the at least one of the second liquid and the air entering the second EX circuit; and the third EX circuit is configured to configured directly and sensibly cool the third liquid using the air, a temperature of the third liquid exiting the third EX circuit being lower than a temperature of the third liquid entering the third EX circuit.

Example 35 provides the system of Example 34 and optionally a liquid transport circuit connected to a liquid outlet of the second EX circuit and configured to transport the water to a heat load in an enclosed space, wherein the second EX circuit is configured to evaporatively cool the water, a temperature of the water exiting the second EX circuit via the liquid outlet being lower than a temperature of the water entering the second EX circuit via a liquid inlet.

Example 36 provides the system of Example 35 and optionally a process plenum configured to direct process air from the enclosed space through a process air inlet and return conditioned process air to the enclosed space through a process air outlet; and a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX, wherein the conditioned process air exiting the process plenum at the process air outlet is returned to the enclosed space.

Example 37 provides the system of Example 36 and optionally the process air entering the LAHX is at least partially return air from the enclosed space.

Example 38 provides the system of Example 35 and optionally the liquid transport circuit is a first liquid transport circuit, and further comprising: a second liquid transport circuit connected to a liquid outlet of the LAHX and configured to transport the water exiting the LAHX to a liquid inlet of the third EX circuit; and a third liquid transport circuit connected to a liquid outlet of the third EX circuit and configured to transport the water exiting the third EX circuit to a liquid inlet of the second EX circuit.

Example 39 provides the system of Example 1 and optionally the plurality of liquid circuits comprises: a first liquid circuit through which a first liquid is configured to flow; a second liquid circuit through which a second liquid is configured to flow, the second liquid circuit arranged downstream of the first liquid circuit in a direction of air flow through the LAEE; a third liquid circuit through which a third liquid is configured to flow, the third liquid circuit arranged downstream of the second liquid circuit in the direction of air flow; and a fourth liquid circuit through which a fourth liquid is configured to flow, the fourth liquid circuit arranged downstream of the third liquid circuit in the direction of air flow the plurality of membranes comprises: a first membrane connected to the liquid panel between the first liquid circuit and the air channel and forming a barrier between the first liquid and the air; a second membrane connected to the liquid panel between the second liquid circuit and the air channel and forming a barrier between the second liquid and the air; a third membrane connected to the liquid panel between the third liquid circuit and the air channel and forming a barrier between the third liquid and the air; and a fourth membrane connected to the liquid panel between the fourth liquid circuit and the air channel and forming a barrier between the fourth liquid and the air; and the plurality of EX circuits comprises: a first EX circuit configured to exchange at least one of latent and sensible energy between the first liquid and the air through the first membrane; a second EX circuit configured to exchange at least one of latent and sensible energy between the second liquid and the air through the second membrane; a third EX circuit configured to exchange at least one of latent and sensible energy between the third liquid and the air through the third membrane; and a fourth EX circuit configured to exchange at least one of latent and sensible energy between the fourth liquid and the air through the fourth membrane.

Example 40 provides the system of Example 39 and optionally the first liquid comprises a liquid desiccant and each of the second, third, and fourth liquids comprises water; each of the first and third membranes comprise a semi-permeable membrane permeable to gases and vapor and impermeable to liquids and solids; each of the second and fourth membranes comprises an impermeable membrane; the first EX circuit is configured to circulate the liquid desiccant to absorb water from the air flowing through the first EX circuit, a moisture content of the air exiting the first EX circuit being lower than a moisture content of the air entering the first EX circuit; the second EX circuit is configured to directly and sensibly cool the air using the water flowing through the second EX circuit, a temperature of the air exiting the second EX circuit being lower than a temperature of the air entering the second EX circuit; the third EX circuit is configured to evaporatively cool at least one of the water flowing through the third EX circuit and the air, a temperature of the at least one of the water and the air exiting the second EX circuit being lower than a temperature of the at least one of the water and the air entering the second EX circuit; and the fourth EX circuit is configured to configured directly and sensibly cool the water flowing through the fourth EX circuit using the air, a temperature of the water exiting the fourth EX circuit being lower than a temperature of the water entering the fourth EX circuit.

Example 41 provides the system of Example 40 and optionally a liquid transport circuit connected to a liquid outlet of the third EX circuit and configured to transport the water to a heat load in an enclosed space, wherein the third EX circuit is configured to evaporatively cool the water, a temperature of the water exiting the third EX circuit via the liquid outlet being lower than a temperature of the water entering the third EX circuit via a liquid inlet.

Example 42 provides the system of Example 41 and optionally a process plenum configured to direct process air from the enclosed space through a process air inlet and return conditioned process air to the enclosed space through a process air outlet; and a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX, wherein the conditioned process air exiting the process plenum at the process air outlet is returned to the enclosed space.

Example 43 provides the system of Example 42 and optionally the process air entering the LAHX is at least partially return air from the enclosed space.

Example 44 provides the system of Example 41 and optionally the liquid transport circuit is a first liquid transport circuit, and further comprising a second liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

Example 45 provides the system of Example 44 and optionally a third liquid transport circuit connected to a liquid outlet of the regenerator and configured to transport at least a portion of the water removed from the liquid desiccant to a liquid inlet of the third EX circuit.

Example 46 provides the system of Example 44 and optionally the regenerator is a thermally driven regenerator.

Example 47 provides the system of Example 44 and optionally a fourth liquid transport circuit connected to a liquid outlet of the LAHX and configured to transport the water exiting the LAHX to a liquid inlet of the fourth EX circuit; and a fifth liquid transport circuit connected to a liquid outlet of the fourth EX circuit and configured to transport the water exiting the fourth EX circuit to a liquid inlet of the third EX circuit.

Example 48 provides the system of Example 1 and optionally each of the plurality of liquid channels comprises a liquid inlet connected to a liquid outlet through a plurality of flow passages.

Example 49 provides the system of Example 48 and optionally the plurality of liquid inlets of the plurality of liquid channels of each of the plurality of liquid circuits are disposed at a first corner of the respective liquid circuit of the single liquid panel, and wherein the plurality of liquid outlets of the plurality of liquid channels of each of the plurality of liquid circuits are disposed at a second corner of the respective liquid circuit of the single liquid panel, the second corner being diagonally opposed to the first corner.

Example 50 provides the system of Example 49 and optionally the first and second corners of each of the plurality of liquid circuits is arranged for counter-flow of a liquid through the respective liquid circuit relative to the direction of air flow.

Example 51 provides the system of Example 48 and optionally the liquid inlets and outlets are vertical and the flow passages are horizontal.

Example 52 provides the system of Example 48 and optionally a first plurality of flow passages connected to a first inlet channel and a first outlet channel; and a second plurality of flow passages connected to a second inlet channel and a second outlet channel.

Example 53 provides the system of Example 52 and optionally the first plurality of flow passages is staggered with respect to the second plurality of flow passages.

Example 54 provides the system of Example 1 and optionally each of the plurality of membranes is selected from the group of membranes consisting of semi-permeable and impermeable membranes.

Example 55 provides the system of Example 1 and optionally one or more of the plurality of membranes is a semi-permeable membrane.

Example 56 provides the system Example 55 and optionally the one or more of the plurality of membranes is selected from the group of membranes consisting of microporous, non-porous ion exchange, and non-porous pervaporation membranes.

Example 57 provides the system of Example 1 and optionally the single liquid panel and the plurality of membranes are a first liquid panel assembly and further comprising a plurality of additional liquid panel assemblies, each of the plurality of liquid panel assemblies comprising: a single liquid panel having a plurality of liquid circuits through each of which a liquid is configured to flow, each of the liquid circuits corresponding to each of the plurality of EX circuits; and a plurality of membranes connected to the liquid panel, at least one of the plurality of membranes corresponding to each of the plurality of liquid circuits, and each one of the plurality of membranes disposed between the respective liquid circuit and the air channel; the air channel is a first air channel and further comprising a plurality of additional air channels, each of the plurality of air channels disposed between two of the plurality of liquid panel assemblies and extending adjacent all of the plurality of liquid circuits of the two of the plurality of liquid panel assemblies.

Example 58 provides the system of Example 57 and optionally the plurality of liquid panel assemblies comprises a first plurality of liquid panel assemblies and a second plurality of liquid panel assemblies, the first plurality of liquid panel assemblies arranged adjacent the second plurality of liquid panel assemblies in a direction generally perpendicular to a direction of air flow through the LAEE, each of the first plurality of liquid panel assemblies having a first plurality of liquid circuits and each of the second plurality of liquid panel assemblies having a second plurality of liquid circuits, the first plurality of liquid circuits comprising: a first liquid circuit through which a first liquid is configured to flow; a second liquid circuit through which a second liquid is configured to flow, the second liquid circuit arranged downstream of the first liquid circuit in the direction of air flow through the LAEE; and a third liquid circuit through which a third liquid is configured to flow, the third liquid circuit arranged downstream of the second liquid circuit in the direction of air flow, the second plurality of liquid circuits comprising: the first liquid circuit through which the first liquid is configured to flow; the second liquid circuit through which the second liquid is configured to flow, the second liquid circuit arranged downstream of the first liquid circuit in the direction of air flow through the LAEE; and a fourth liquid circuit through which a fourth liquid is configured to flow, the fourth liquid circuit arranged downstream of the second liquid circuit in the direction of air flow, the third liquid circuit being fluidically isolated from the fourth liquid circuit; the plurality of EX circuits comprising a first plurality of EX circuits and a second plurality of EX circuits, each of the first plurality of liquid circuits corresponding to each of the first plurality of EX circuits and each of the second plurality of liquid circuits corresponding to each of the second plurality of EX circuits, the first plurality of EX circuits comprises: a first EX circuit configured to exchange at least one of latent and sensible energy between the first liquid and the air; a second EX circuit is configured to exchange at least one of latent and sensible energy between the second liquid and the air; and a third EX circuit is configured to exchange at least one of latent and sensible energy between the third liquid and the air, the second plurality of EX circuits comprises: the first EX circuit configured to exchange at least one of latent and sensible energy between the first liquid and the air; the second EX circuit is configured to exchange at least one of latent and sensible energy between the second liquid and the air; and a fourth EX circuit is configured to exchange at least one of latent and sensible energy between the fourth liquid and the air.

Example 59 provides the system of Example 58 and optionally the first liquid comprises a liquid desiccant and each of the second, third, and fourth liquids comprises water; the first EX circuit is configured to circulate the liquid desiccant to absorb water from the air flowing through the first EX circuit, a moisture content of the air exiting the first EX circuit being lower than a moisture content of the air entering the first EX circuit; the second EX circuit is configured to directly and sensibly cool the air using the water flowing through the second EX circuit, a temperature of the air exiting the second EX circuit being lower than a temperature of the air entering the second EX circuit; the third EX circuit is configured to evaporatively cool the air flowing through the third EX circuit, a temperature of the air exiting the third EX circuit being lower than a temperature of the air entering the third EX circuit; and the fourth EX circuit is configured to evaporatively cool the water flowing through the fourth EX circuit using the air, a temperature of the water exiting the fourth EX circuit being lower than a temperature of the water entering the fourth EX circuit.

Example 60 provides the system of Example 59 and optionally the air entering the LAEE through the inlet of the LAEE is at least partially return air from an enclosed space.

Example 61 provides the system of Example 59 and optionally a first liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

Example 62 provides the system of Example 61 and optionally a second liquid transport circuit connected to a liquid outlet of the regenerator and configured to transport at least a portion of the water removed from the liquid desiccant to a liquid inlet of the third EX circuit.

Example 63 provides the system of Example 62 and optionally a third liquid transport circuit connected to a liquid outlet of the second EX circuit and configured to transport at least a portion of the water exiting the second EX circuit to a liquid inlet of the fourth EX circuit.

Example 64 provides the system of Example 63 and optionally a fourth liquid transport circuit connected to a liquid outlet of the fourth EX circuit and configured to transport at least a portion of the water exiting the fourth EX circuit to a liquid inlet of the second EX circuit.

Example 65 provides the system of Example 61 and optionally the regenerator is a thermally driven regenerator.

Example 68 provides a method including arranging a liquid-to-air energy exchanger (LAEE) having a plurality of energy exchange (EX) circuits within or in proximity to an enclosed space, the LAEE comprising: a single liquid panel having a plurality of liquid circuits through each of which a liquid is configured to flow, each of the liquid circuits corresponding to each of the plurality of EX circuits; an air channel adjacent the liquid panel and through which air is configured to flow from an inlet of the LAEE to an outlet of the LAEE, the air channel extending adjacent all of the plurality of liquid circuits; and a plurality of membranes connected to the liquid panel, each of the plurality of membranes corresponding to each of the plurality of liquid circuits and disposed between the respective liquid circuit and the air channel; directing air through the air channel from the inlet of the LAEE to the outlet of the LAEE; directing one or more liquids through each of the plurality of liquid circuits of the single liquid panel; and in each of the plurality of EX circuits, exchanging at least one of latent and sensible energy between a liquid flowing through the respective liquid circuit and the air flowing through the air channel through the respective membrane.

Various aspects of the disclosure have been described. These and other aspects are within the scope of the following claims.

What is claimed is:
1. A conditioning system comprising:
a liquid-to-air energy exchanger (LAEE) having a plurality of energy exchange (EX) circuits, the LAEE comprising:
a single liquid panel having a plurality of liquid circuits through each of which a liquid is configured to flow, each of the plurality of liquid circuits having a plurality of closed liquid channels through each of which a liquid is configured to flow without mixing with the liquid flowing through other of the plurality of closed liquid channels, and each of the liquid circuits corresponding to each of the plurality of EX circuits;
an air channel adjacent the liquid panel and through which air is configured to flow from an inlet of the LAEE to an outlet of the LAEE, the air channel extending adjacent all of the plurality of liquid circuits; and
a plurality of membranes connected to the liquid panel, at least one of the plurality of membranes corresponding to each of the plurality of liquid circuits, and each one of the plurality of membranes disposed between the respective liquid circuit and the air channel, and
wherein:
each of the plurality of EX circuits is configured to exchange at least one of latent and sensible energy between a liquid flowing through the respective liquid circuit and the air;
the plurality of liquid circuits comprises:
a first liquid circuit through which a first liquid is configured to flow; and
a second liquid circuit through which a second liquid is configured to flow, the second liquid circuit arranged downstream of the first liquid circuit in a direction of air flow through the LAEE;
the plurality of membranes comprises:
a first membrane connected to the liquid panel between the first liquid circuit and the air channel and forming a barrier between the first liquid and the air; and a second membrane connected to the liquid panel between the second liquid circuit and the air channel and forming a barrier between the second liquid and the air; and the plurality of EX circuits comprises:
a first EX circuit configured to exchange at least one of latent and sensible energy between the first liquid and the air through the first membrane; and
a second EX circuit configured to exchange at least one of latent and sensible energy between the second liquid and the air through the second membrane.

2. The conditioning system of claim 1, wherein:
the first liquid comprises a liquid desiccant and the second liquid comprises water;
each of the first and second membranes comprise a semi-permeable membrane permeable to gases and vapor and impermeable to liquids and solids;
the first EX circuit is configured to circulate the liquid desiccant to absorb water from the air flowing through the first EX circuit, a moisture content of the air exiting the first EX circuit being lower than a moisture content of the air entering the first EX circuit; and
the second EX circuit is configured to evaporatively cool at least one of the water and the air, a temperature of the at least one of the water and the air exiting the second EX circuit being lower than a temperature of the at least one of the water and the air entering the second EX circuit.

3. The conditioning system of claim 2, wherein:
the LAEE defines a process plenum and the air is process air;
the second EX circuit is configured to evaporatively cool the process air entering the second EX circuit and deliver the conditioned process air to an enclosed space, a temperature of the conditioned process air exiting the second EX circuit being lower than a temperature of the process air entering the second EX circuit.

4. The conditioning system of claim 3, wherein the process air entering the LAEE is at least partially return air from the enclosed space.

5. The conditioning system of claim 3, further comprising a first liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

6. The conditioning system of claim 5, further comprising a second liquid transport circuit connected to a liquid outlet of the regenerator and configured to transport at least a portion of the water removed from the liquid desiccant to a liquid inlet of the second EX circuit.

7. The conditioning system of claim 5, wherein the regenerator is a thermally driven regenerator.

8. The conditioning system of claim 2, further comprising:
a liquid transport circuit connected to a liquid outlet of the second EX circuit and configured to transport the water to a heat load in an enclosed space, wherein the second EX circuit is configured to evaporatively cool the water, a temperature of the water exiting the second EX circuit via the liquid outlet being lower than a temperature of the water entering the second EX circuit via a liquid inlet.

9. The conditioning system of claim 8, wherein the air is scavenger air and further comprising:
a process plenum configured to direct process air from the enclosed space through a process air inlet and return conditioned process air to the enclosed space through a process air outlet; and
a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX,
wherein the conditioned process air exiting the process plenum at the process air outlet is returned to the enclosed space.

10. The conditioning system of claim 9, wherein the process air entering the LAHX is at least partially return air from the enclosed space.

11. The conditioning system of claim 9, wherein the liquid transport circuit is a second liquid transport circuit, and further comprising a first liquid transport circuit connected to a liquid outlet of the first EX circuit and configured to transport the liquid desiccant from the first EX circuit to a regenerator, the regenerator configured to increase a concentration of the liquid desiccant by removing water from the liquid desiccant, the regenerator fluidically connected to the first EX circuit to transport the concentrated liquid desiccant back to the first EX circuit.

12. The conditioning system of claim 11, further comprising a third liquid transport circuit connected to a liquid outlet of the regenerator and configured to transport at least a portion of the water removed from the liquid desiccant to a liquid inlet of the second EX circuit.

13. The conditioning system of claim 11, wherein the regenerator is a thermally driven regenerator.

14. The conditioning system of claim 1, wherein:
the first membrane comprises an impermeable membrane;
the second membrane comprises a semi-permeable membrane permeable to gases and vapor and impermeable to liquids and solids;
the first EX circuit is configured to directly and sensibly cool the air using the first liquid, a temperature of the air exiting the first EX circuit being lower than a temperature of the air entering the first EX circuit; and
the second EX circuit is configured to evaporatively cool at least one of the second liquid and the air, a temperature of the at least one of the second liquid and the air exiting the second EX circuit being lower than a temperature of the at least one of the second liquid and the air entering the second EX circuit.

15. The conditioning system of claim 14, wherein:
the LAEE defines a process plenum and the air is process air;
the second EX circuit is configured to evaporatively cool the process air entering the second EX circuit and deliver the conditioned process air to an enclosed space, a temperature of the conditioned process air exiting the second EX circuit being lower than a temperature of the process air entering the second EX circuit.

16. The conditioning system of claim 15, wherein the process air entering the LAEE is at least partially return air from the enclosed space.

17. The conditioning system of claim 14, further comprising:
- a liquid transport circuit connected to a liquid outlet of the second EX circuit and configured to transport the water to a heat load in an enclosed space, wherein the second EX circuit is configured to evaporatively cool the water, a temperature of the water exiting the second EX circuit via the liquid outlet being lower than a temperature of the water entering the second EX circuit via a liquid inlet.

18. The conditioning system of claim 17, wherein the air is scavenger air and further comprising:
- a process plenum configured to direct process air from the enclosed space through a process air inlet and return conditioned process air to the enclosed space through a process air outlet; and
- a liquid-to-air heat exchanger (LAHX) arranged inside the process plenum, the LAHX comprising a liquid inlet connected to and configured to receive the water from the liquid transport circuit, the LAHX configured to directly and sensibly cool the process air using the water flowing through the LAHX, a temperature of the conditioned process air exiting the LAHX being lower than a temperature of the air entering the LAHX,
- wherein the conditioned process air exiting the process plenum at the process air outlet is returned to the enclosed space.

19. The conditioning system of claim 18, wherein the process air entering the LAHX is at least partially return air from the enclosed space.

20. A method comprising:
- arranging a liquid-to-air energy exchanger (LAEE) having a plurality of energy exchange (EX) circuits within or in proximity to an enclosed space, the LAEE comprising:
  - a single liquid panel having a plurality of liquid circuits through each of which a liquid is configured to flow, each of the liquid circuits corresponding to each of the plurality of EX circuits;
  - an air channel adjacent the liquid panel and through which air is configured to flow from an inlet of the LAEE to an outlet of the LAEE, the air channel extending adjacent all of the plurality of liquid circuits; and
  - a plurality of membranes connected to the liquid panel, each of the plurality of membranes corresponding to each of the plurality of liquid circuits and disposed between the respective liquid circuit and the air channel, wherein:
- the plurality of liquid circuits comprises:
  - a first liquid circuit through which a first liquid is configured to flow; and
  - a second liquid circuit through which a second liquid is configured to flow, the second liquid circuit arranged downstream of the first liquid circuit in a direction of air flow through the LAEE;
- the plurality of membranes comprises:
  - a first membrane connected to the liquid panel between the first liquid circuit and the air channel and forming a barrier between the first liquid and the air; and
  - a second membrane connected to the liquid panel between the second liquid circuit and the air channel and forming a barrier between the second liquid and the air; and
- the plurality of EX circuits comprises:
  - a first EX circuit configured to exchange at least one of latent and sensible energy between the first liquid and the air through the first membrane; and
- a second EX circuit configured to exchange at least one of latent and sensible energy between the second liquid and the air through the second membrane;
- directing air through the air channel from the inlet of the LAEE to the outlet of the LAEE;
- directing the first liquid through the first EX circuit;
- directing the second liquid through the second EX circuit;
- in the first EX circuit, exchanging at least one of latent and sensible energy between the first liquid flowing through the first liquid circuit and the air flowing through the air channel through the first membrane; and
- in the second EX circuit, exchanging at least one of latent and sensible energy between the second liquid flowing through the second liquid circuit and the air flowing through the air channel through the second membrane.

* * * * *